United States Patent
Hirata et al.

(10) Patent No.: US 10,310,321 B2
(45) Date of Patent: Jun. 4, 2019

(54) OPTICAL ELEMENT, MANUFACTURING METHOD OF OPTICAL ELEMENT, AND OPTICAL DEVICE

(75) Inventors: Koji Hirata, Ibaraki (JP); Hiroyuki Minemura, Tokyo (JP); Yumiko Anzai, Tokyo (JP); Tetsuya Nishida, Tokyo (JP); Jiro Yamamoto, Tokyo (JP); Naoyuki Kofuji, Tokyo (JP); Hidehiro Ikeda, Ibaraki (JP); Nobuyuki Kimura, Ibaraki (JP)

(73) Assignee: MAXELL, LTD., Kyoto (JP)

( * ) Notice: Subject to any disclaimer, the term of this patent is extended or adjusted under 35 U.S.C. 154(b) by 670 days.

(21) Appl. No.: 14/404,529

(22) PCT Filed: Jun. 21, 2012

(86) PCT No.: PCT/JP2012/065882
§ 371 (c)(1),
(2), (4) Date: Apr. 30, 2015

(87) PCT Pub. No.: WO2013/190681
PCT Pub. Date: Dec. 27, 2013

(65) Prior Publication Data
US 2015/0234230 A1    Aug. 20, 2015

(51) Int. Cl.
*G02F 1/1335* (2006.01)
*G02B 5/30* (2006.01)
(Continued)

(52) U.S. Cl.
CPC ......... *G02F 1/133528* (2013.01); *G02B 5/30* (2013.01); *G02B 5/3058* (2013.01);
(Continued)

(58) Field of Classification Search
CPC ....... G02B 5/3058; G02F 2001/133548; G02F 2001/133388
See application file for complete search history.

(56) References Cited

U.S. PATENT DOCUMENTS 6,243,199 B1   6/2001  Hansen et al.
8,922,890 B2 * 12/2014 Bangerter ............... G02B 5/30
                                                    359/485.05
(Continued)

FOREIGN PATENT DOCUMENTS

JP    2003-508813 A    3/2003
JP    2005-339630 A    12/2005
(Continued)

OTHER PUBLICATIONS

Tamada et al., Al wire-grid polarizer using the s-polarization resonance effect at the 0.8-μm-wavelength band, Optical Society of America, Optics Letters, 1997, pp. 419-421, vol. 22, No. 6.

*Primary Examiner* — Paisley L Arendt
(74) *Attorney, Agent, or Firm* — Baker Botts L.L.P.

(57) ABSTRACT

In order to improve a characteristic of an optical element, an optical element (polarizing filter) including a substrate 1S having a wire-grid region 1A and a peripheral region 2A positioned on an outer periphery thereof is made to have the following configuration. A wire-grid in which a plurality of line-shaped wires P10 made of Al and extending in a y direction are arranged at spaces S in an x direction is provided in the wire-grid region 1A of the substrate 1S, and a pattern (repetitive pattern) in which a plurality of protruding portions P20 made of Al are arranged is provided in the peripheral region 2A. This pattern is, for example, a checkerboard pattern. According to the above-mentioned configuration, the plurality of wires P10 can be arranged so that their respective ends are spaced apart from an end of the substrate 1S, so that the wires P10 can be prevented from being deformed and nicked. Also, by the plurality of protruding portions P20 in the peripheral region 2A, it is possible to prevent water from entering the wire-grid region 1A.

10 Claims, 32 Drawing Sheets

(51) Int. Cl.
*G03B 21/20* (2006.01)
*G03B 33/12* (2006.01)
*H04N 9/31* (2006.01)
*G02F 1/1333* (2006.01)

(52) U.S. Cl.
CPC ......... *G03B 21/2073* (2013.01); *G03B 33/12* (2013.01); *H04N 9/3105* (2013.01); *H04N 9/3167* (2013.01); *G02F 2001/133388* (2013.01); *G02F 2001/133548* (2013.01)

(56) References Cited

U.S. PATENT DOCUMENTS

| | | | |
|---|---|---|---|
| 2006/0172119 A1 | 8/2006 | Hayashi et al. | |
| 2008/0186576 A1 | 8/2008 | Takada | |
| 2010/0085507 A1 | 4/2010 | Cho et al. | |
| 2010/0321773 A1* | 12/2010 | Chen | G02B 21/0032 359/386 |
| 2011/0085238 A1* | 4/2011 | Minemura | G02B 5/085 359/489.01 |
| 2012/0236415 A1 | 9/2012 | Nagano et al. | |

FOREIGN PATENT DOCUMENTS

| | | |
|---|---|---|
| JP | 2006-317807 A | 11/2006 |
| JP | 2007-069604 A | 3/2007 |
| JP | 2010-92005 A | 4/2010 |
| JP | 2011-123347 A | 6/2011 |
| JP | 2011-164180 A | 8/2011 |
| JP | 2012-103728 A | 5/2012 |
| JP | 2012-113280 A | 6/2012 |
| WO | 2005-010572 A1 | 2/2005 |

* cited by examiner

TM-POLARIZED LIGHT

TE-POLARIZED LIGHT (A)

(B)

(A)

(B)
ENTRANCE OF WATER (C)

(A)

(B)

(A)

(B)

OPTICAL ELEMENT, MANUFACTURING METHOD OF OPTICAL ELEMENT, AND OPTICAL DEVICE

TECHNICAL FIELD

The present invention relates to an optical element, a manufacturing method of an optical element, and an optical device.

BACKGROUND

Optical devices have widely spread, and an optical element that controls light has often been used in, for example, a liquid crystal projector, a display, an optical pickup, an optical sensor and others. Also, as these devices have been highly functional, the optical element has been required to be highly functional, high-value added, and lower in cost.

Here, Patent Document 1 and Non-Patent Document 1 describe techniques relating to a wire-grid element having a metal wire structure on a transparent substrate.

PRIOR ART DOCUMENTS

Patent Documents

Patent Document 1: Japanese Unexamined Patent Application Publication No. 2003-508813 (U.S. Pat. No. 6,243,199)

Non-Patent Documents

Non-Patent Document 1: H. Tamada, et al., "Al wire-grid polarizer using the s-polarization resonance", Opt. Lett. 22, 6, pp. 419-421 (1997)

SUMMARY

Problems to be Solved by the Invention

The inventors of the present invention are engaged in research and development of an optical element including a concave and convex portion having a periodic structure on which an electromagnetic wave is incident, for example, a wire-grid polarizer (polarizing filter).

According to the studies on the above-mentioned wire-grid polarizer by the inventors of the present invention, abnormalities in shape such as deformation and nicking at an end of a metal wire and a deteriorated portion (discolored portion) extending from the end of the metal wire have been observed.

Therefore, an object of the present invention is to improve a characteristic of an optical element including a periodic concave and convex portion.

The other problems and novel characteristics will be apparent from the description of the present specification and the accompanying drawings.

Means for Solving the Problems

An optical element according to one embodiment includes a substrate having a first region and a second region positioned on an outer periphery of the first region. Further, a first projection group in which a plurality of line-shaped first projections made of a first material and extending in a first direction are arranged at first intervals in a second direction crossing the first direction is provided in the first region of the substrate, and a second projection group in which a plurality of second projections made of the first material are arranged is provided in the second region.

Effects of the Invention

According to one embodiment, the performance of an optical element can be improved.

DETAILED DESCRIPTION

Figure 1:
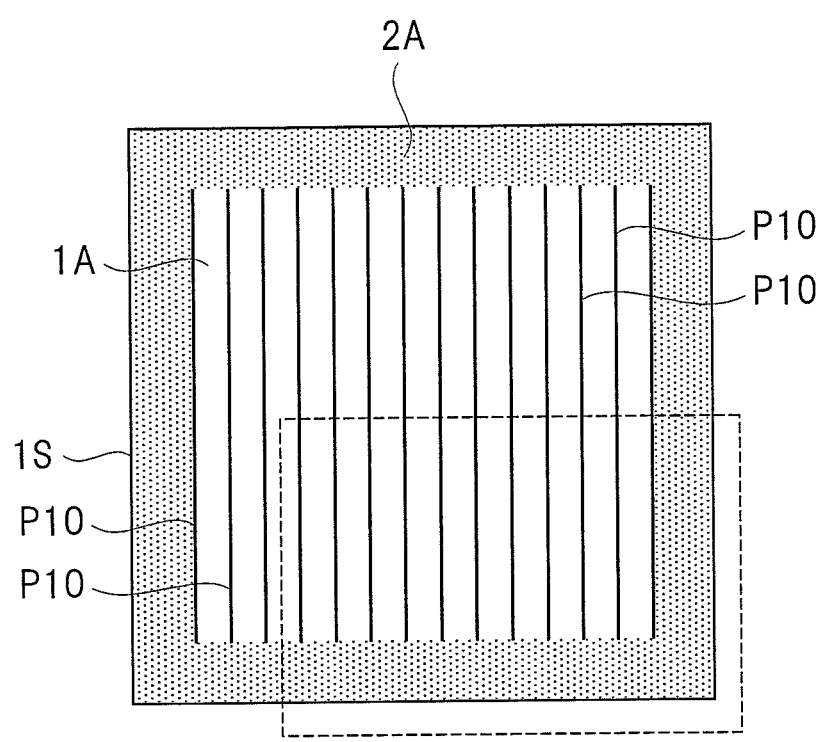
FIG. 1 is a plan view schematically illustrating a configuration of an optical element according to the first embodiment.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle, and the number larger or smaller than the specified number is also applicable.

Further, in the embodiments described below, the components (including element steps) are not always indispensable unless otherwise stated or except the case where the components are apparently indispensable in principle.

Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the above-mentioned numbers (number of pieces, numerical values, amount, range, and the like).

Also, components having the same function are denoted by the same reference characters throughout the drawings for describing the embodiments in principle, and the repetitive description thereof is omitted. Further, hatching is used in some cases even in a plan view so as to make the drawings easy to see.

First Embodiment

A structure of an optical element according to the present embodiment and a manufacturing method of the same will be described in detail below with reference to the drawings.

[Description of Structure]

Figure 2:
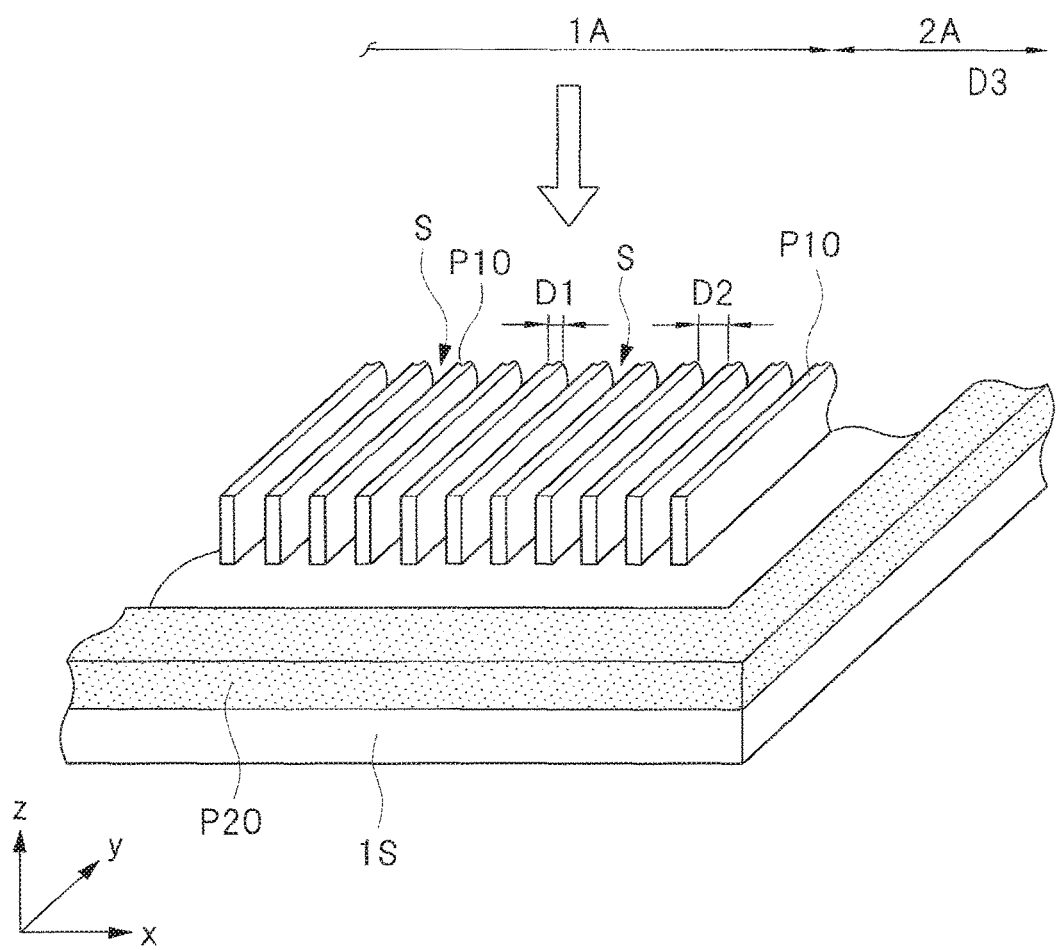
FIG. 2 is a perspective view illustrating a part of FIG. 1.

FIG. 1 is a plan view schematically illustrating a configuration of an optical element according to the present embodiment, and FIG. 2 is a perspective view illustrating a part (region enclosed by a broken line) of FIG. 1. A characteristic configuration of the optical element according to the present embodiment will be described below.

As illustrated in FIGS. 1 and 2, an optical element (transmission type optical element, polarizing filter) according to the present embodiment includes a substrate 1S and a plurality of wires (metal thin wires, projections) P10 arranged on the substrate 1S. The plurality of wires P10 are arranged in a wire-grid region 1A, and a peripheral region 2A is arranged on the outer periphery of the wire-grid region 1A.

The wire P10 is made of, for example, a metal such as Al (aluminum), has a line shape extending in a y direction, has a width of D1 in an x direction, and has a height of H1 in a z direction. Such wires P10 are repeatedly (periodically) arranged at predetermined intervals (spaces) S in the x direction. The width of the interval S in the x direction is D2. A structure in which such wires P10 are periodically arranged is referred to as a wire-grid structure (wiring grating structure, projection group).

The peripheral region 2A is, for example, a region having a width D3 from an end of the substrate (chip region) 1S. In the peripheral region 2A, a pattern (repetitive pattern, projection group) made up of a plurality of protruding portions (projections, convex-shaped patterns, dummy patterns, peripheral patterns, water-resistant portions) P20 is arranged as described below. The protruding portion P20 is made of the same material as that of the wire P10, that is, a metal such as Al (aluminum) in this case. Note that this pattern is a portion that does not need to have a polarization function described below.

Figure 3:
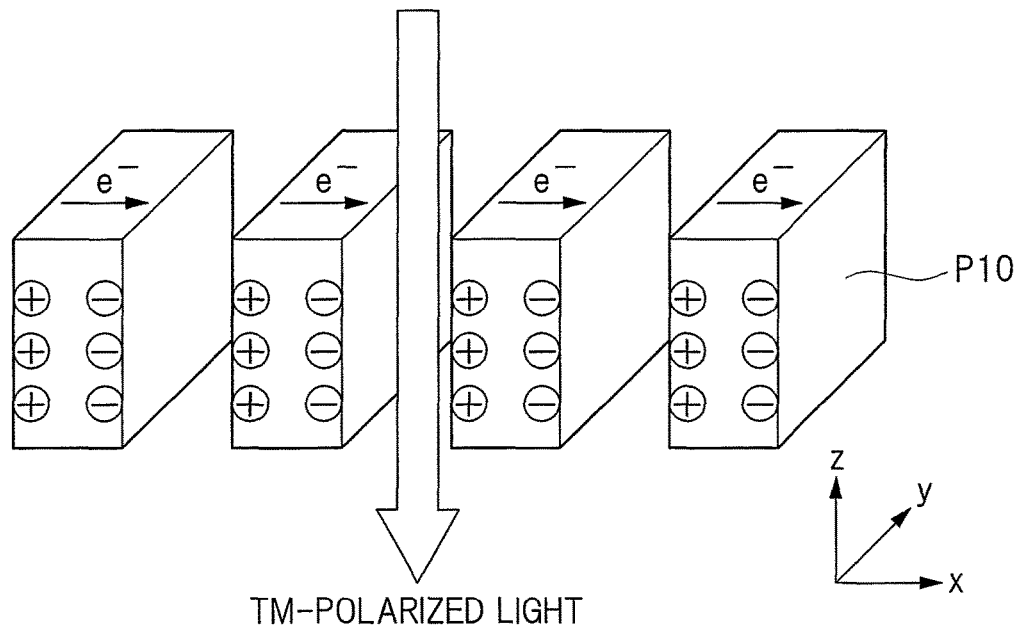
FIG. 3 is a view illustrating a mechanism in which TM-polarized light is transmitted through a wire-grid structure.

When light (electromagnetic wave) including various polarized lights is incident on the optical element having such a wire-grid structure from above a paper surface (plus z-axis direction), only the polarized light, which has been polarized in a specific direction, can be transmitted from a lower part of the substrate 1S. More specifically, the transmission type optical element having the wire-grid structure functions as a polarizing filter (polarizing element, polarizer). This mechanism (operation principle) will be simply described below. FIG. 3 is a diagram illustrating a mechanism in which TM-polarized light is transmitted through the wire-grid structure, and FIG. 4 is a diagram illustrating a mechanism in which TE-polarized light is reflected by the wire-grid structure.

As illustrated in FIG. 3, when TM (Transverse Magnetic) polarized light whose electric field vibrates in the x-axis direction is incident, free electrons in each of the wires (metal thin wires) P10 constituting the wire-grid structure are collected on one side of the wire P10 in accordance with the vibration direction of the electric field, so that polarization occurs in each of the wires P10. As described above, when the TM-polarized light is incident, since polarization only occurs in the wire P10, the TM-polarized light passes through the wire-grid structure and reaches the substrate 1S. At this time, since the substrate 1S is also transparent, the TM-polarized light is transmitted also through the substrate 1S. As a result, the TM-polarized light is transmitted through the wire-grid structure and the substrate 1S.

Figure 4:
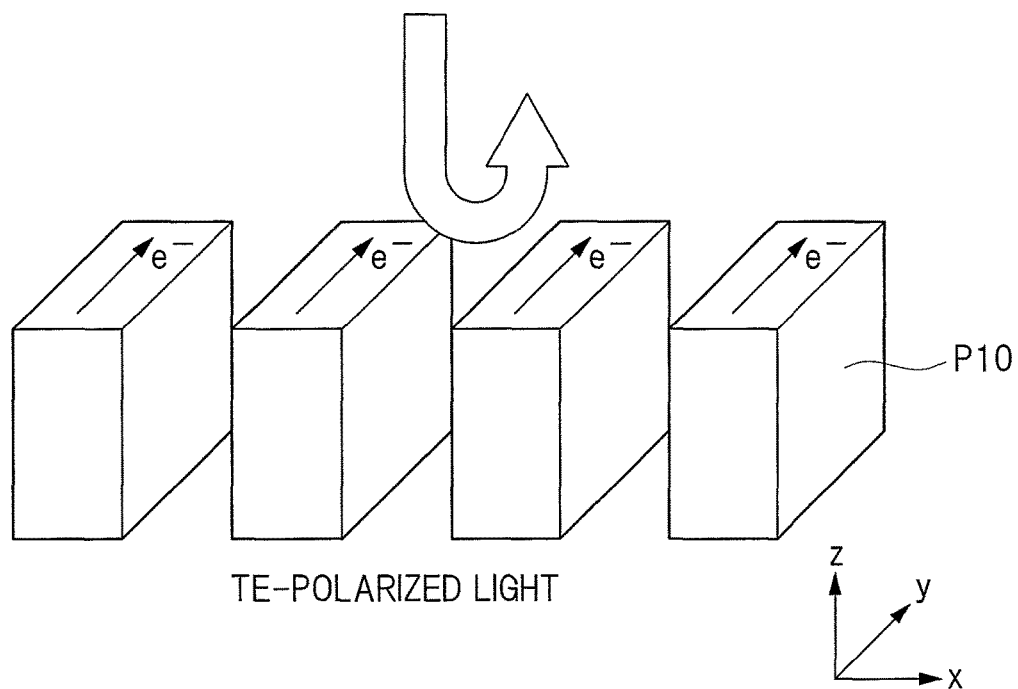
FIG. 4 is a view illustrating a mechanism in which TE-polarized light is reflected by a wire-grid structure.

On the other hand, as illustrated in FIG. 4, when TE (Transverse Electric) polarized light whose electric field vibrates in the y direction is incident, free electrons in each of the wires (metal thin wires) P10 can vibrate without being restricted by a sidewall of the wire P10 in accordance with the vibration direction of the electric field. This means that a phenomenon similar to that in the case where light is incident on a continuous metal film occurs also when the TE-polarized light is incident on the wire-grid structure. Therefore, when the TE-polarized light is incident on the wire-grid structure, the TE-polarized light is reflected like the case where light is incident on the continuous metal film. At this time, if the thickness of the metal thin wire in the z direction is larger than the thickness (Skin Depth) in which light can enter a metal, the wire-grid structure has a polarization separation function with a high separation performance (extinction ratio) for transmitting the TM-polarized light and reflecting the TE-polarized light.

From the foregoing, for example, the transmission type optical element having the wire-grid structure has a function of transmitting only the polarized light which has been polarized in a specific direction when light including various polarized lights is incident. This means that the optical element having the wire-grid structure functions as a polarizing filter. Thus, the polarizing filter having the wire-grid structure made of an inorganic material is useful in terms of superior heat resistance and light resistance in comparison with a film polarizer made of an organic polymer or the like.

Also, in the present embodiment, by arranging the plurality of wires P10 so that the ends of the wires P10 are spaced apart from the end of the substrate (chip region) 1S, the plurality of wires P10 can be prevented from being deformed and nicked. Also, by providing a plurality of protruding portions (P20) between the ends of the wires P10 and the end of the substrate 1S (in the peripheral region 2A), entrance (penetration) of water into the wire-grid region 1A can be prevented.

Although the height (thickness) of the protruding portion P20 is sufficient if it is approximately 1 to 10 μm, it can be adjusted as needed depending on the height (thickness) of the wire P10 and the film thickness of a metal layer ML described below.

Also, the width of the peripheral region 2A (distance from the end of the substrate 1S to the wire-grid region 1A) is sufficient if it is approximately 1 μm to 3 μm. As described in detail below, the substrate 1S is cut out by cutting (dicing, scribing) a substrate in a substantially circular wafer shape (hereinafter, referred to as a wafer substrate W) along a dicing line (scribe line) DL into individual pieces (chips) (see FIG. 7). Accordingly, a region for the dicing line (scribing line) DL is ensured between chip regions CH on the wafer substrate W. Also, as described below, in the incorporation into an optical device such as a liquid crystal projector (see FIG. 42), a folder and an insulation margin are set in a width of at least 100 μm or more from the end of the substrate 1S. In this manner, by providing the peripheral region 2A using such a region, a characteristic of the optical element can be maintained, and the protruding portions (P20 and others) can be provided without enlarging the substrate 1S (chip region CH).

Figure 5:
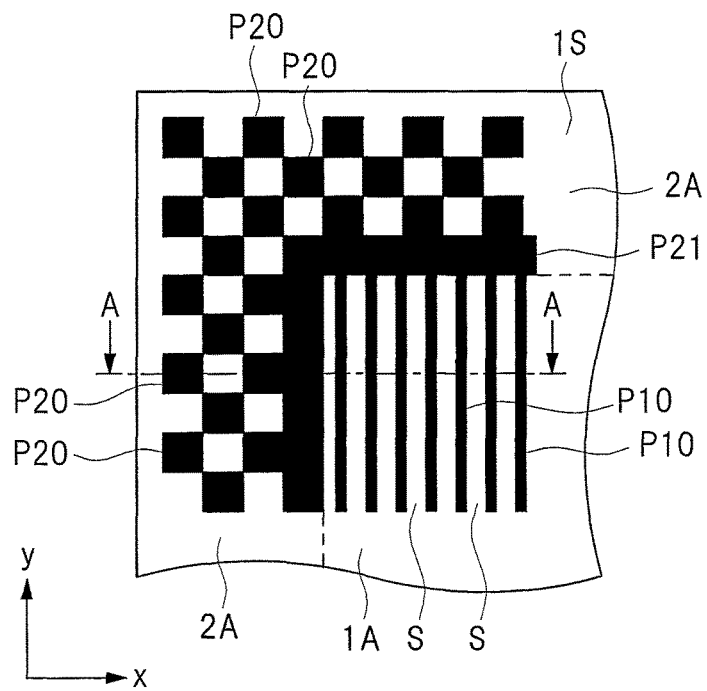
FIG. 5 is a plan view illustrating a part of the optical element according to the first embodiment.
Figure 6:
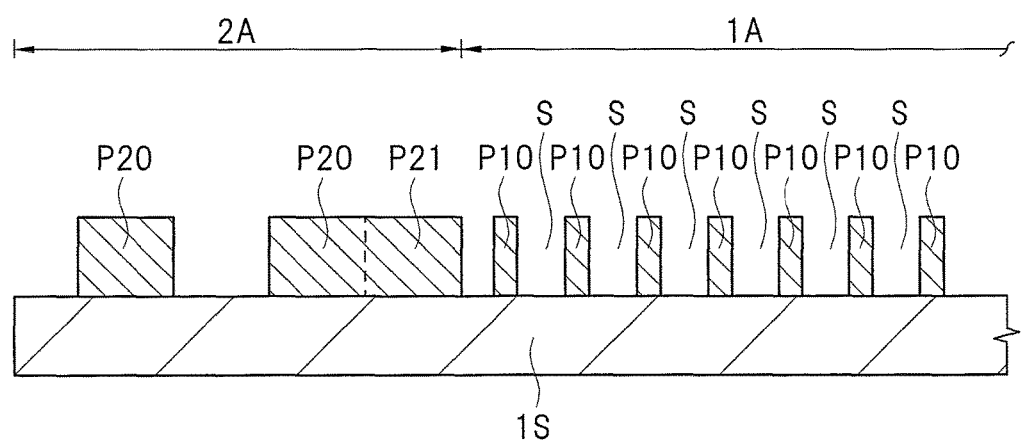
FIG. 6 is a cross-sectional view illustrating a part of the optical element according to the first embodiment.

FIG. 5 is a plan view illustrating a part of the optical element according to the present embodiment, and FIG. 6 is a cross-sectional view illustrating a part of the optical element according to the present embodiment. FIG. 5 corresponds to, for example, the upper left part of the optical element illustrated in FIG. 1. Also, FIG. 6 corresponds to, for example, a cross-sectional portion taken along a line A-A illustrated in FIG. 5.

As illustrated in FIGS. 5 and 6, in the present embodiment, protruding portions (P20, P21) are arranged in the peripheral region 2A.

In this case, the protruding portion (guard ring) P21 is provided so as to surround the wire-grid region 1A on the inner periphery (on the side of the wire-grid region 1A) in the peripheral region 2A. Also, the plurality of protruding portions P20 are provided on the outer periphery (on the side of the end, outer periphery of the protruding portion P21) in the peripheral region 2A.

The protruding portion P20 is in a substantially square prism shape, and is substantially square when seen in a plan view from the top as illustrated in FIG. 5. The plurality of protruding portions P20 are provided in the peripheral region 2A, and each of the protruding portions is arranged to be a checkerboard pattern (checkered pattern, checker pattern, alternate arrangement, staggered arrangement) when seen in a plan view from the top. In other words, in a relationship between projections formed of the protruding portions P20 and recesses between the protruding portions P20, the projections and the recesses are alternately arranged (alternate arrangement, staggered arrangement, checkerboard arrangement) so that the projections are not arranged side by side and the recesses are not arranged side by side in the x direction and the y direction.

As described above, in the present embodiment, since the plurality of protruding portions P20 in a checkerboard pattern are provided in the peripheral region 2A, it is possible to prevent water from entering the wire-grid region 1A. Also, since the protruding portion P21 is provided inside the peripheral region 2A so as to surround the wire-grid region 1A, it is possible to prevent water from entering the wire-grid region 1A.

Figure 7:
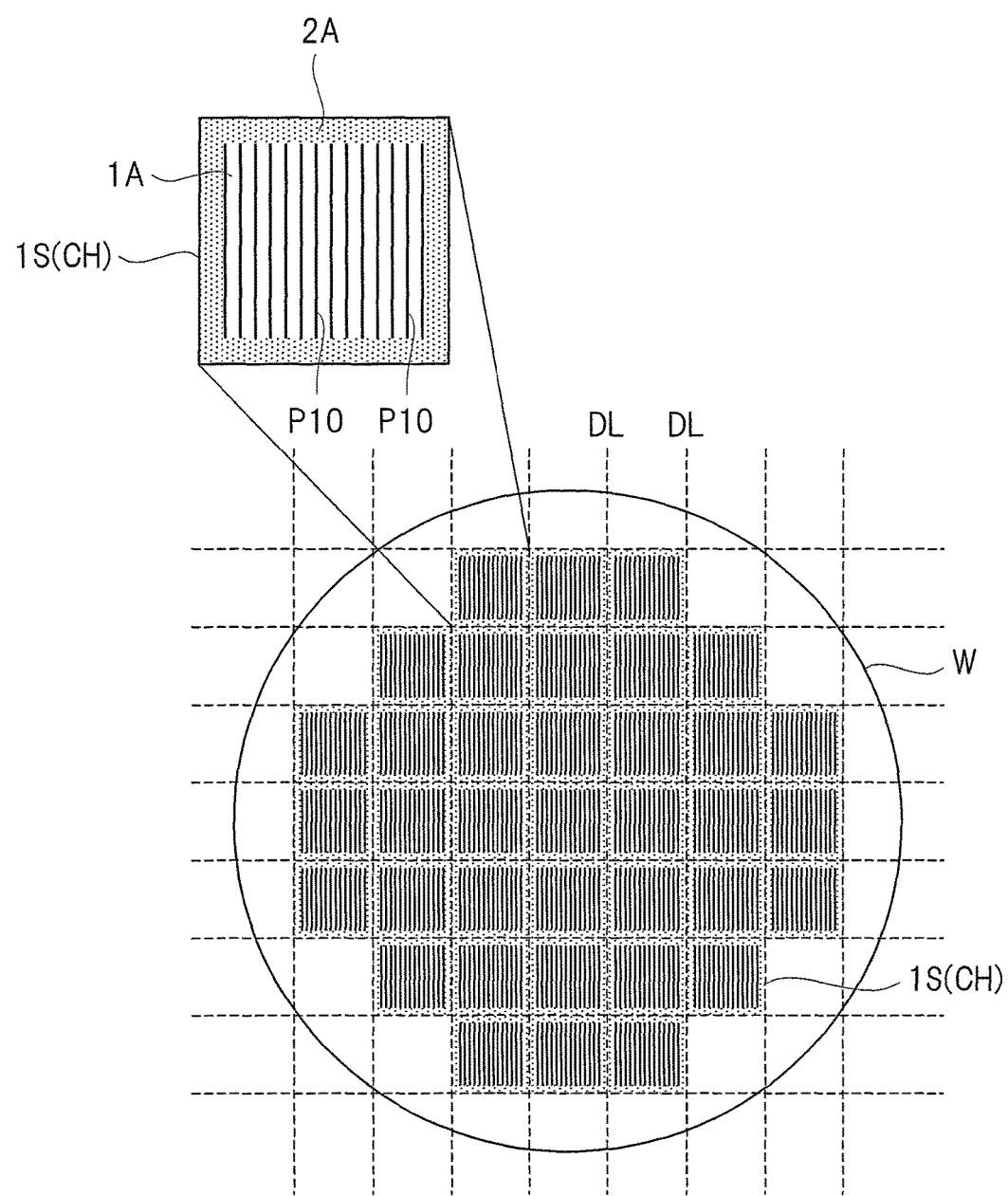
FIG. 7 is a plan view illustrating a state where the optical elements according to the first embodiment are formed on a substantially circular wafer-shaped substrate.

For example, the optical element according to the present embodiment illustrated in FIG. 1 and others is formed in each of a plurality of chip regions CH on the wafer substrate W illustrated in FIG. 7. Then, the optical element is formed by cutting (dicing, scribing) the wafer substrate W along the dicing lines (scribe lines) DL into individual pieces (chips). FIG. 7 is a plan view illustrating a state where the optical elements according to the present embodiment are formed on a substrate in a substantially circular wafer shape.

[Description of Manufacturing Method]

A manufacturing method of an optical element according to the present embodiment will be described below with reference to FIGS. 8 to 22, and a configuration of the optical element will be more clarified. FIGS. 8 to 22 are cross-sectional views and plan views of a principal part illustrating the manufacturing process of the optical element according to the present embodiment. The cross-sectional view of the principal part corresponds to, for example, a cross-sectional portion taken along a line A-A in FIG. 5.

In the present embodiment, the wires P10, the protruding portions P20, and the protruding portion P21 are formed on the substrate 1S by using a nanoimprint method. The nanoimprint method is a technique for performing microfabrication by pressing a stamper (mold member) onto a substrate. Accordingly, since the stamper serving as a mold for nanoimprint is used in this method, an optical element formation process will be described after a stamper formation process is described.

<Stamper Formation Process>

Figure 8:
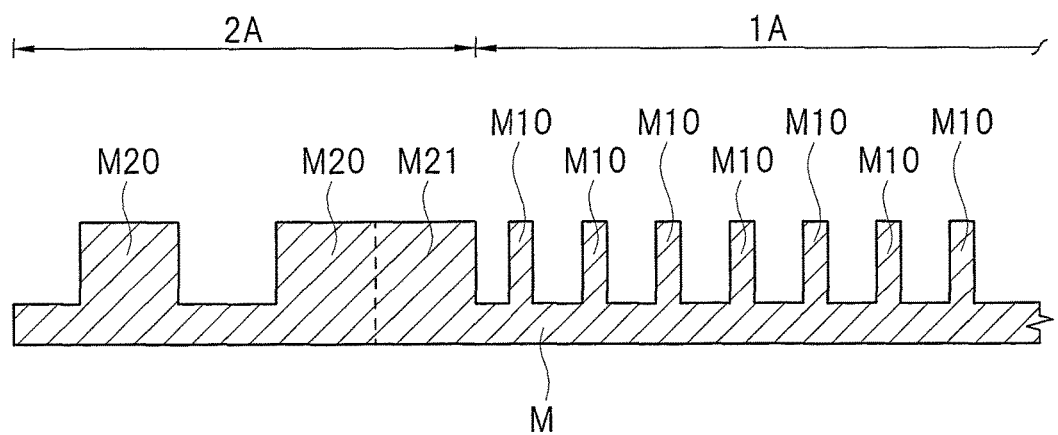
FIG. 8 is a cross-sectional view of a principal part illustrating a manufacturing process of the optical element according to the first embodiment.

First, as illustrated in FIG. 8, a master (original plate) M serving as a mold of a stamper is formed. By processing a master substrate composed of a silicon (Si) substrate or the like, projections corresponding to shapes of the wires P10, the protruding portions P20, and the protruding portion P21 are formed (FIG. 8). Among the projections, the projections corresponding to the wires P10, the projections corresponding to the protruding portions P20 and the projection corresponding to the protruding portion P21 are denoted by M10, M20 and M21, respectively.

For example, a photoresist film (not illustrated) is formed on a silicon substrate, and then exposed and developed (photolithography), thereby leaving the photoresist film only in the regions where the projections are to be formed. Next, a surface of the silicon substrate is etched to a predetermined depth with using the photoresist film as a mask, thereby forming the projections (M10, M20, M21). Next, the photoresist film remaining on the projections (M10, M20, M21) is removed by aching process or others.

Although the exposure/development (photolithography) technique is used in the above-mentioned process, an electron beam drawing method may also be used. For example, it is also possible to form a resist film for electron beam drawing (not illustrated) on a silicon substrate and draw a pattern by electron beam, thereby processing the resist film.

Figure 9:
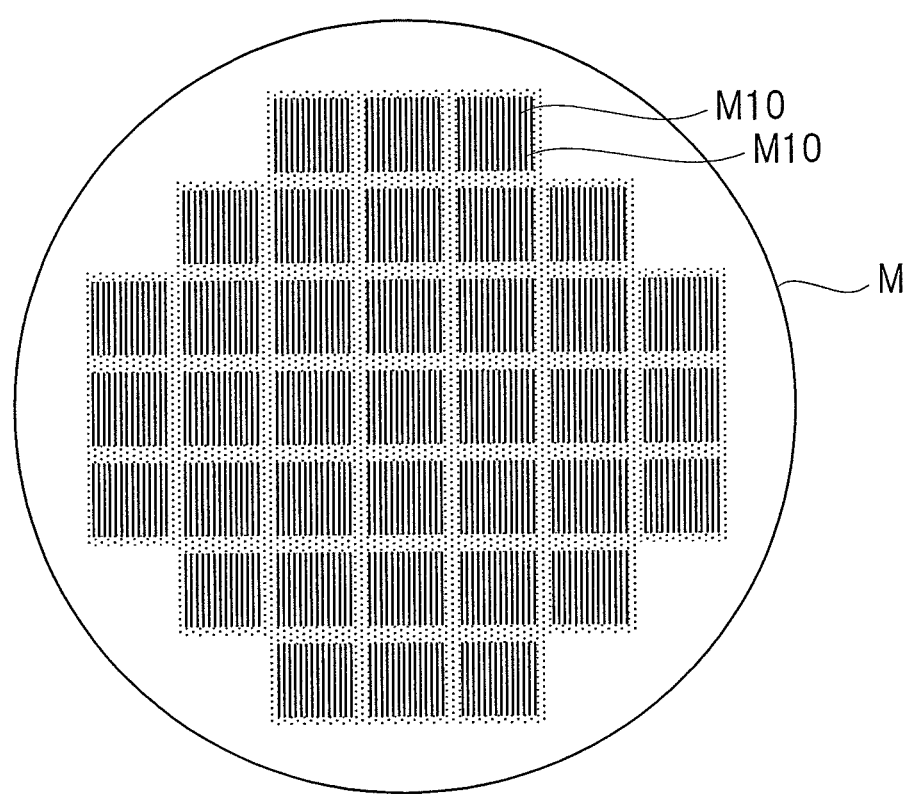
FIG. 9 is a plan view illustrating the manufacturing process of the optical element according to the first embodiment.

As illustrated in FIG. 9, for example, this master M is formed so as to correspond to the wafer substrate W. More specifically, projections (M10, M20, M21) for the plurality of chip regions CH are formed on a main surface of the master substrate.

Figure 10:
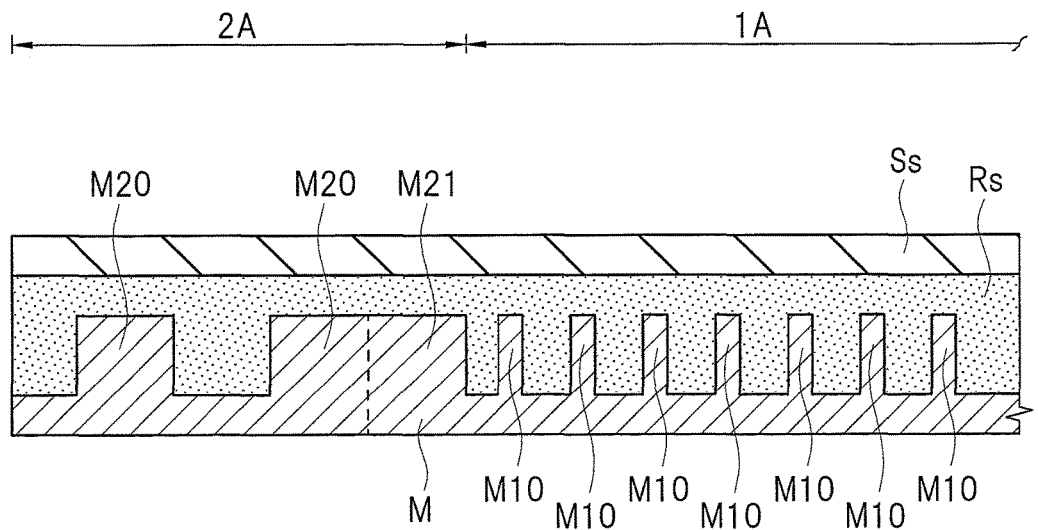
FIG. 10 is a cross-sectional view of a principal part illustrating the manufacturing process of the optical element according to the first embodiment continued from FIG. 8.
Figure 11:
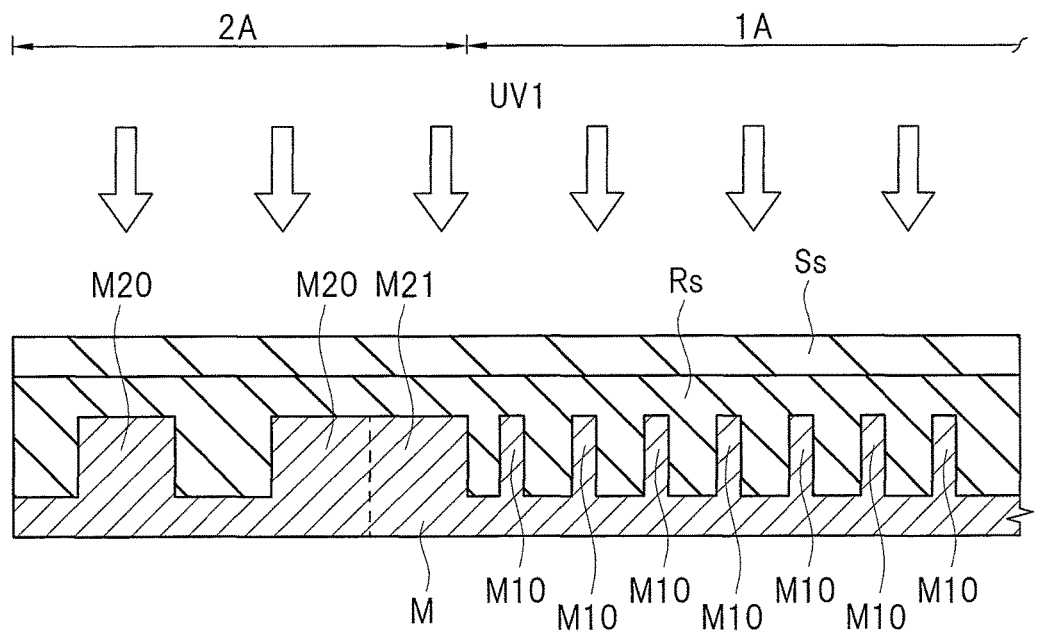
FIG. 11 is a cross-sectional view of a principal part illustrating the manufacturing process of the optical element according to the first embodiment continued from FIG. 10.

Then, as illustrated in FIG. 10, UV curable resin Rs to be cured by UV (ultraviolet) irradiation is applied onto the master M. Then, a support substrate (support base material) Ss for a stamper is mounted on the UV curable resin Rs. This support substrate Ss is, for example, a transparent resin substrate. Then, as illustrated in FIG. 11, the UV curable resin Rs is irradiated with UV light (UV1) via the support substrate Ss. Thus, the applied resin is cured.

Figure 12:
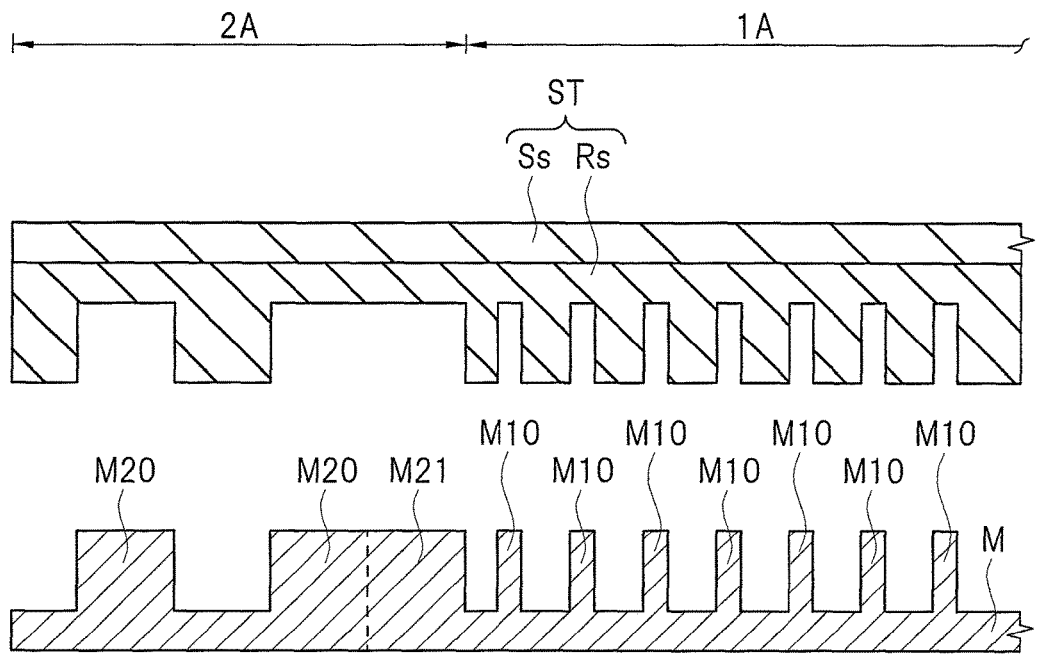
FIG. 12 is a cross-sectional view of a principal part illustrating the manufacturing process of the optical element according to the first embodiment continued from FIG. 11.
Figure 13:
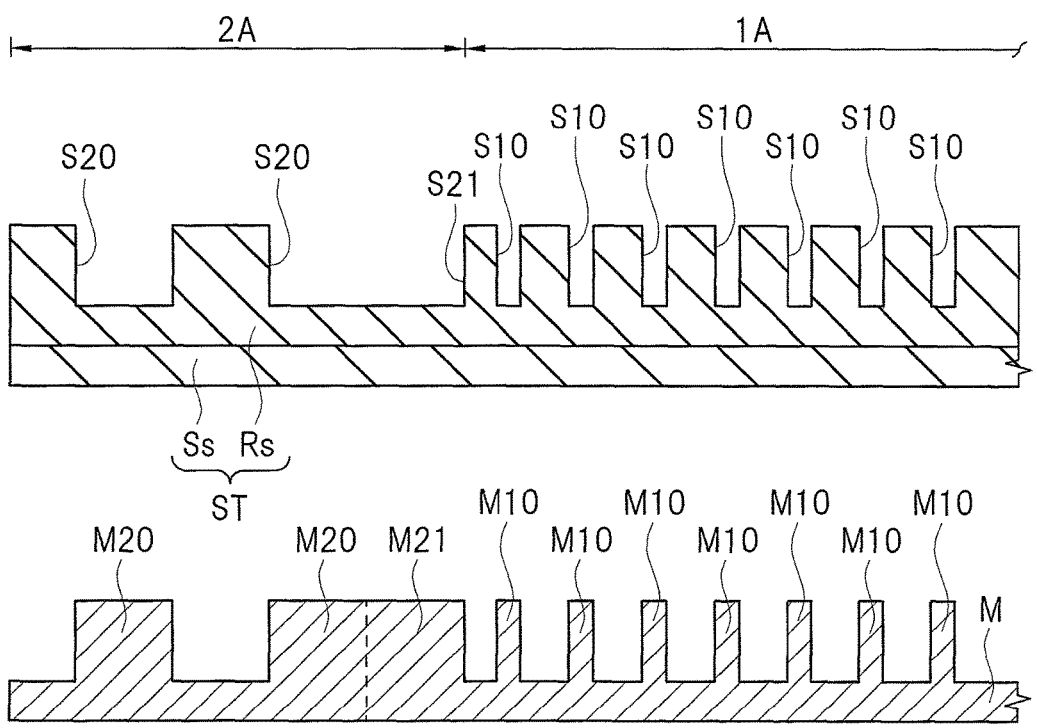
FIG. 13 is a cross-sectional view of a principal part illustrating the manufacturing process of the optical element according to the first embodiment continued from FIG. 12.

Then, as illustrated in FIG. 12, the UV curable resin Rs and the support substrate Ss are stripped from the master M (mold release process). In this manner, as illustrated in FIG. 13, a stamper (resin stamper, soft stamper) ST including the support substrate Ss and the UV curable resin Rs is formed. The projections (M10, M20, M21) in the master M are transferred onto a layer of the UV curable resin Rs in the stamper ST, and grooves (recesses) corresponding to the projections are formed therein. Among the grooves, the grooves corresponding to the projections M10, the grooves corresponding to the projections M20, and the groove corresponding to the projection M21 are denoted by S10, S20 and S21, respectively.

Figure 14:
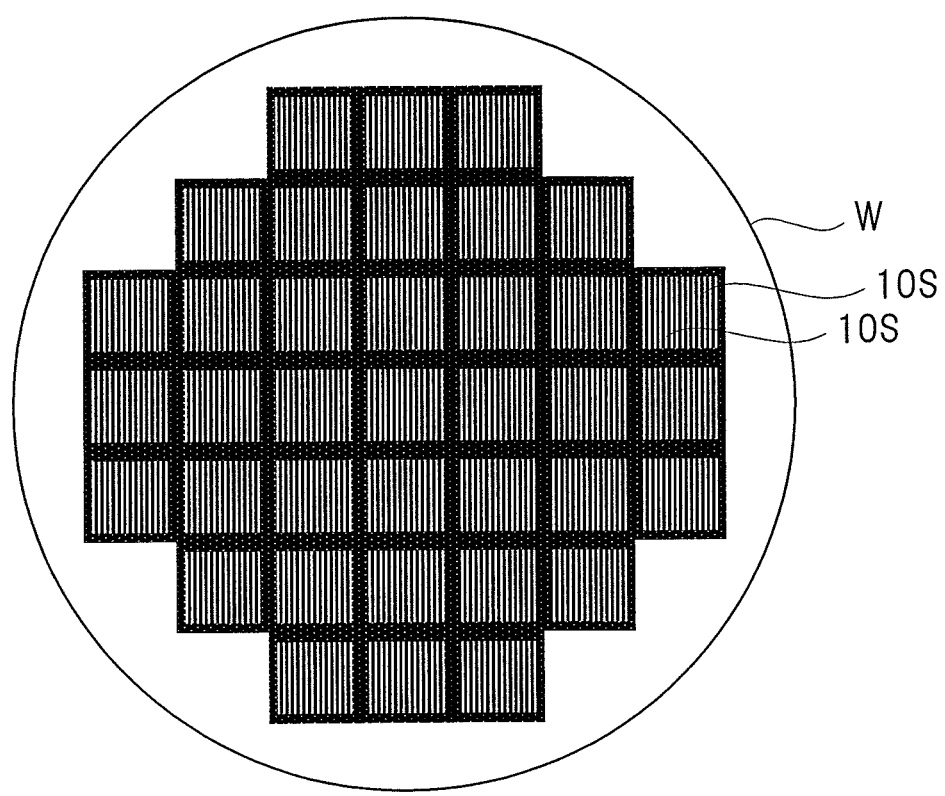
FIG. 14 is a plan view illustrating the manufacturing process of the optical element according to the first embodiment.

As illustrated in FIG. 14, for example, this stamper ST is formed so as to correspond to the wafer substrate W. More specifically, the grooves (S10, S20, S21) corresponding to the projections (M10, M20, M21) for the plurality of chip regions CH are formed in the layer of the UV curable resin Rs in the stamper ST.

<Optical Element Formation Process>

Next, the optical element (polarizing filter) is formed by using the nanoimprint method using the above-mentioned stamper ST.

Figure 15:
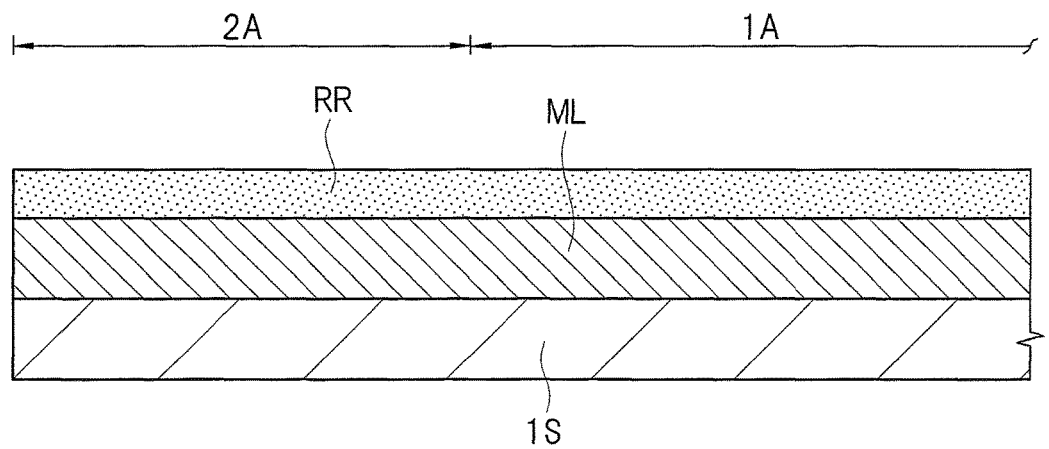
FIG. 15 is a cross-sectional view of a principal part illustrating the manufacturing process of the optical element according to the first embodiment.

First, as illustrated in FIG. 15, for example, a glass substrate is prepared as a substrate 1S having light transimissivity. This substrate 1S has, for example, a substantially circular wafer shape. Then, an Al (aluminum) layer or the like is formed as a metal layer (film to be processed) ML on the substrate 1S by sputtering or the like. Next, resist resin RR is applied onto the metal layer ML. UV curable resin can be used as the resist resin.

Figure 16:
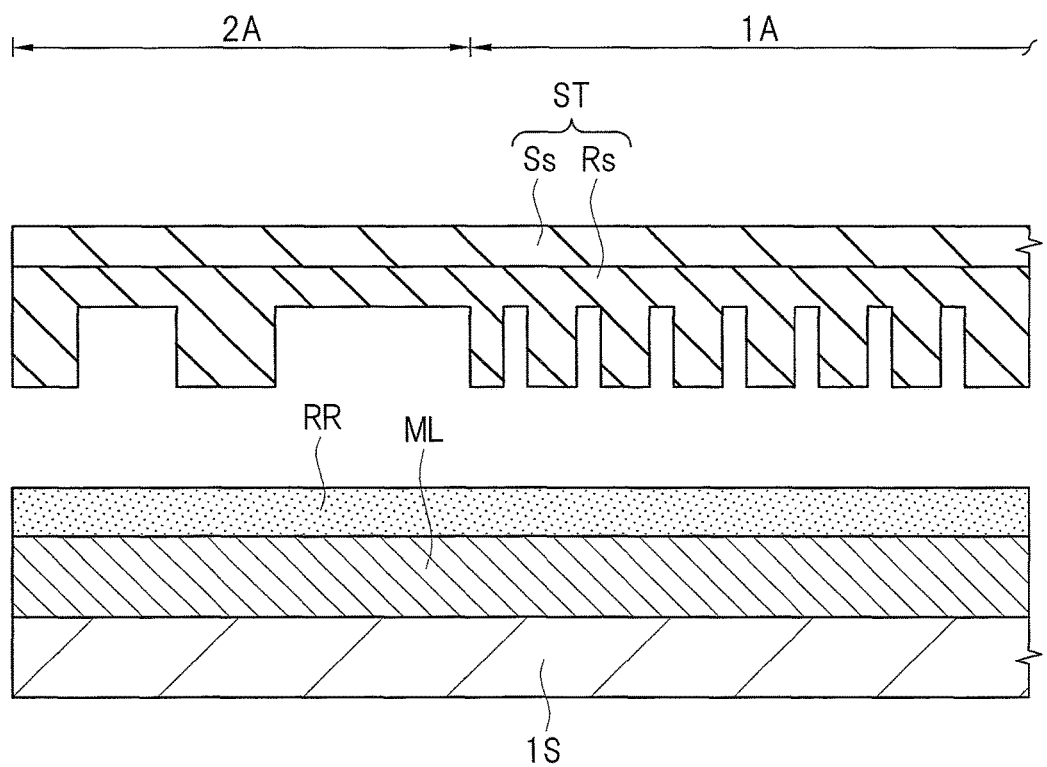
FIG. 16 is a cross-sectional view of a principal part illustrating the manufacturing process of the optical element according to the first embodiment continued from FIG. 15.

Next, as illustrated in FIG. 16, the stamper ST is arranged above the substrate 1S, and the stamper ST is pressed onto an upper surface of the substrate 1S. Thus, inner parts of the grooves (S10, S20, S21) in the stamper ST are filled with the resist resin RR. At this time, an application amount of the resist resin RR and a pressing force of the stamper ST onto the substrate 1S (resist resin RR) are adjusted so that the inner parts of the grooves (S10, S20, S21) are filled with the resist resin RR with high accuracy.

Figure 17:
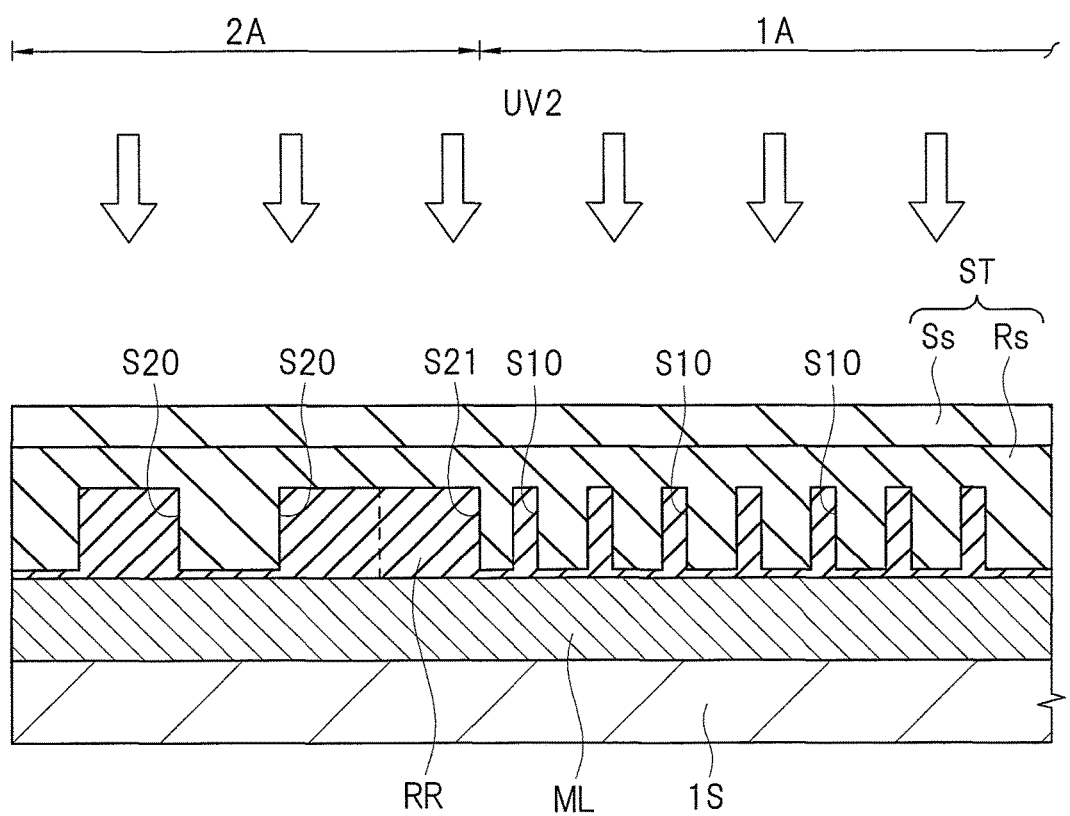
FIG. 17 is a cross-sectional view of a principal part illustrating the manufacturing process of the optical element according to the first embodiment continued from FIG. 16.

Next, as illustrated in FIG. 17, the resist resin RR is irradiated with UV light (UV2) via the stamper ST, thereby curing the resist resin RR. For example, the UV light (UV2) is UV light having a longer wavelength than the above-mentioned UV light (UV1). By avoiding the wavelength of the above-mentioned UV light (UV1), that is, a curing wavelength (solidification wavelength) of the stamper ST as the UV light (UV2) in this manner, the deterioration of the stamper ST can be prevented.

Figure 18:
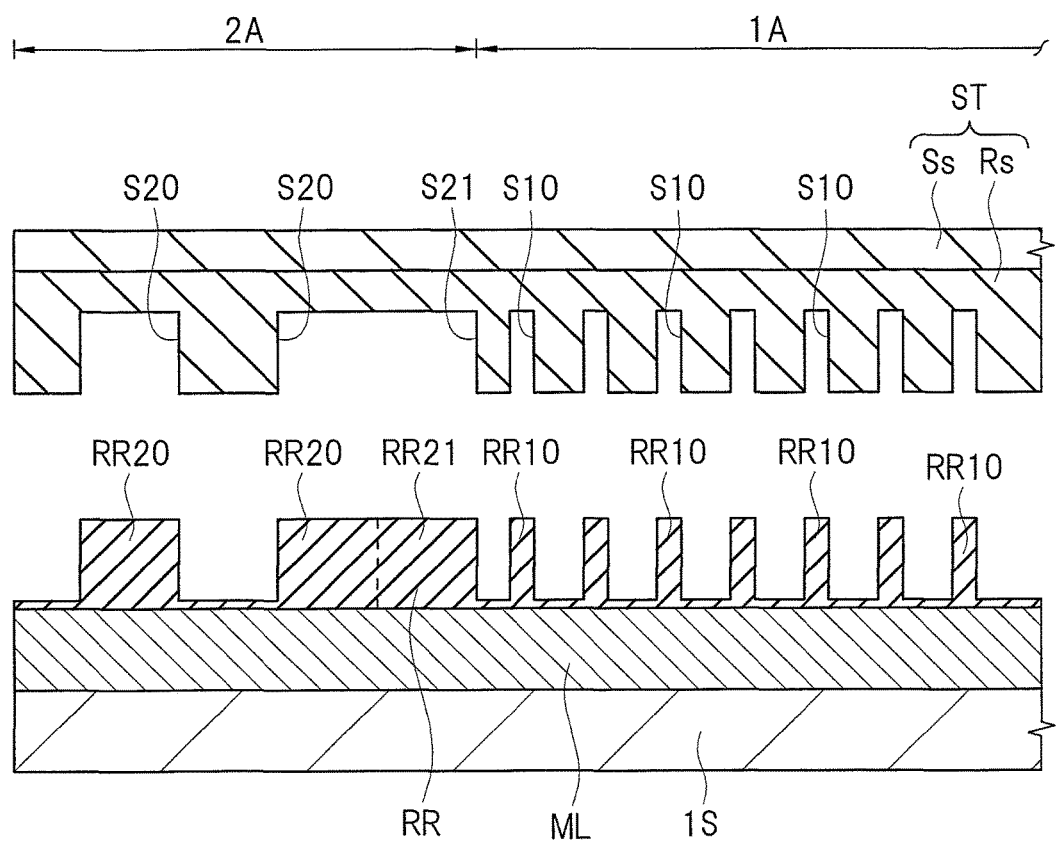
FIG. 18 is a cross-sectional view of a principal part illustrating the manufacturing process of the optical element according to the first embodiment continued from FIG. 17.
Figure 19:
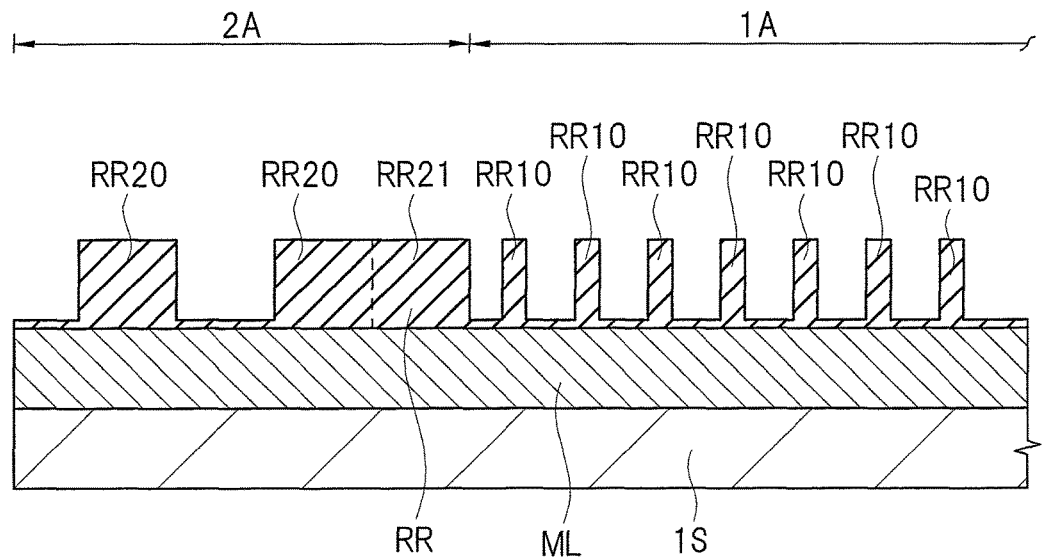
FIG. 19 is a cross-sectional view of a principal part illustrating the manufacturing process of the optical element according to the first embodiment continued from FIG. 18.

Next, as illustrated in FIG. 18, the resist resin RR is stripped from the stamper ST (mold release process). Thus, shapes of the grooves (S10, S20, S21) in the stamper ST are transferred onto the resist resin RR. More specifically, the resist resin RR having projections (resist patterns) corresponding to the grooves (S10, S20, S21) is formed on the metal layer ML. Among the projections (resist patterns), the projections corresponding to the grooves S10, the projections corresponding to the grooves S20, the projection corresponding to the groove S21 are denoted by RR10, RR20, and RR21, respectively (FIG. 19).

Figure 20:
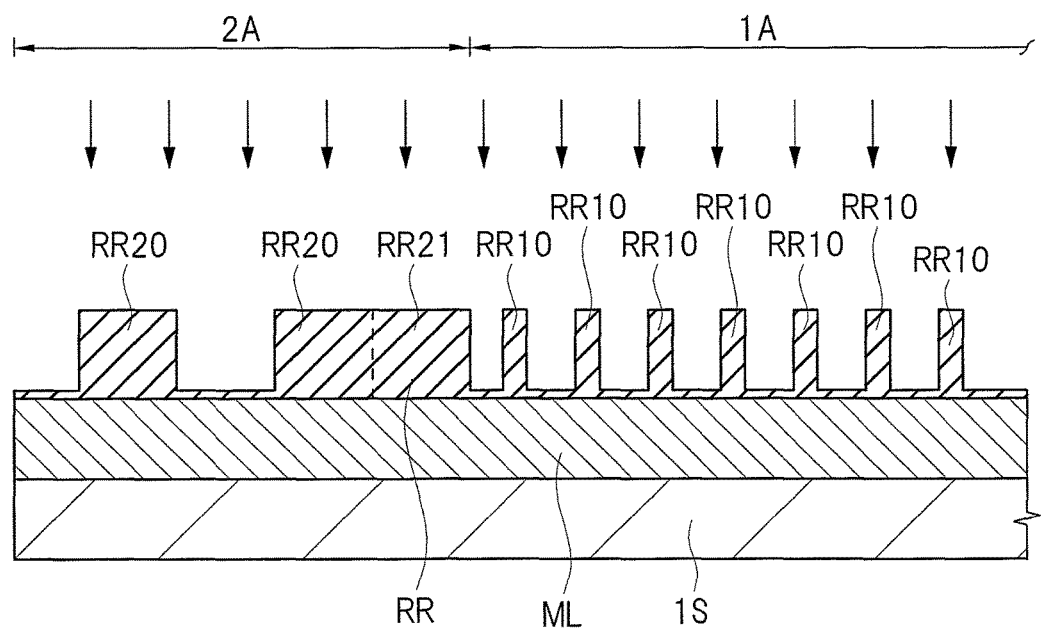
FIG. 20 is a cross-sectional view of a principal part illustrating the manufacturing process of the optical element according to the first embodiment continued from FIG. 19.
Figure 21:
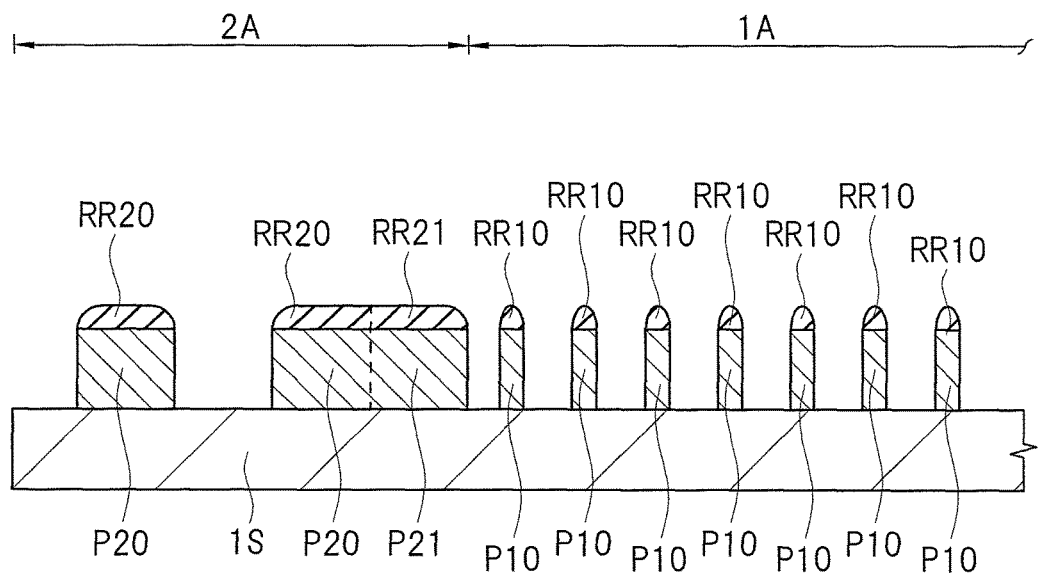
FIG. 21 is a cross-sectional view of a principal part illustrating the manufacturing process of the optical element according to the first embodiment continued from FIG. 20.

Next, as illustrated in FIG. 20, the metal layer (metal film) ML is dry-etched with using the processed resist resin RR as a mask. As the etching gas, for example, $Cl_2$ gas (chlorine gas), $BCl_3$ gas, or mixed gas thereof may be used. The etching gas may be ionized when used. By the dry etching like this, the wires P10, the protruding portions P20, and the protruding portion P21 serving as patterns of the metal layer ML and corresponding to the projections (RR10, RR20, RR21) of the resist resin RR are formed (FIG. 21). Note that upper parts of the resist resin (projections RR10, RR20, and RR21) RR may be shaven by this etching process.

Figure 22:
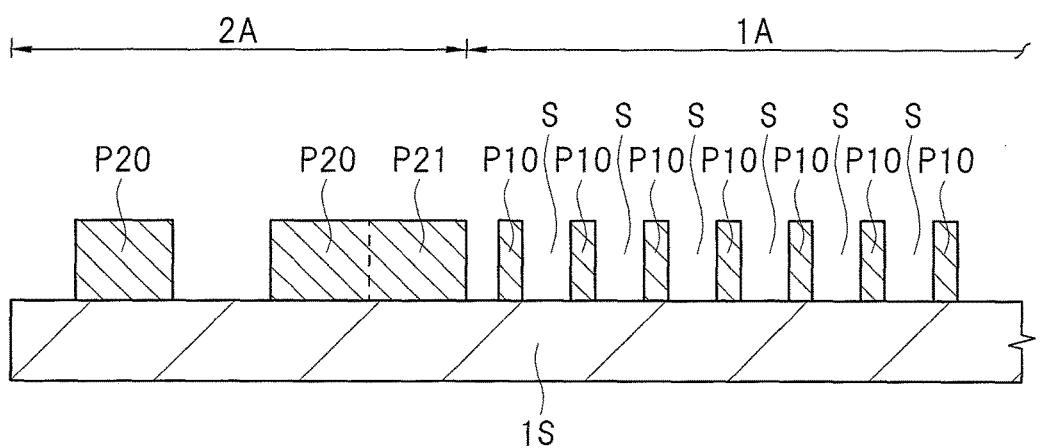
FIG. 22 is a cross-sectional view of a principal part illustrating the manufacturing process of the optical element according to the first embodiment continued from FIG. 21.

Next, the resist resin (projections RR10, RR20, and RR21) RR remaining in upper parts of the wires P10, the protruding portions P20, and the protruding portion P21 made of the metal layer ML is removed by ashing or others (FIG. 22). For example, gas mainly containing $O_2$ (oxygen) is used as the ashing gas. The ashing gas may be ionized when used.

By the foregoing processes, the wires P10, the protruding portions P20, and the protruding portion P21 can be formed in each of the plurality of chip regions CH in the wafer substrate W (see FIG. 7).

Thereafter, the wafer substrate W is diced (cut, scribed) along dicing lines (scribe lines) DL into individual pieces (chips) (see FIG. 7). In this manner, the optical element can be formed.

As described above, by using the nanoimprint method, the optical element according to the present embodiment can be efficiently formed with a high throughput.

Also, in the optical element according to the present embodiment, since the plurality of wires P10 are arranged so that the ends of the wires P10 are spaced apart from the end of the substrate (chip region) 1S as described above, the wires P10 can be prevented from being deformed and nicked. In particular, even when stress caused by a dicing saw such as a diamond cutter is applied to the wafer substrate W in the above-mentioned dicing process, the plurality of wires P10 are prevented from being deformed or nicked by the dicing saw.

Also, in the optical element according to the present embodiment, since the protruding portions (P20, P21) are provided between the ends of the wires P10 and the end of the substrate 1S (in the peripheral region 2A), entrance (penetration) of water into the wire-grid region 1A can be prevented.

Figure 23:
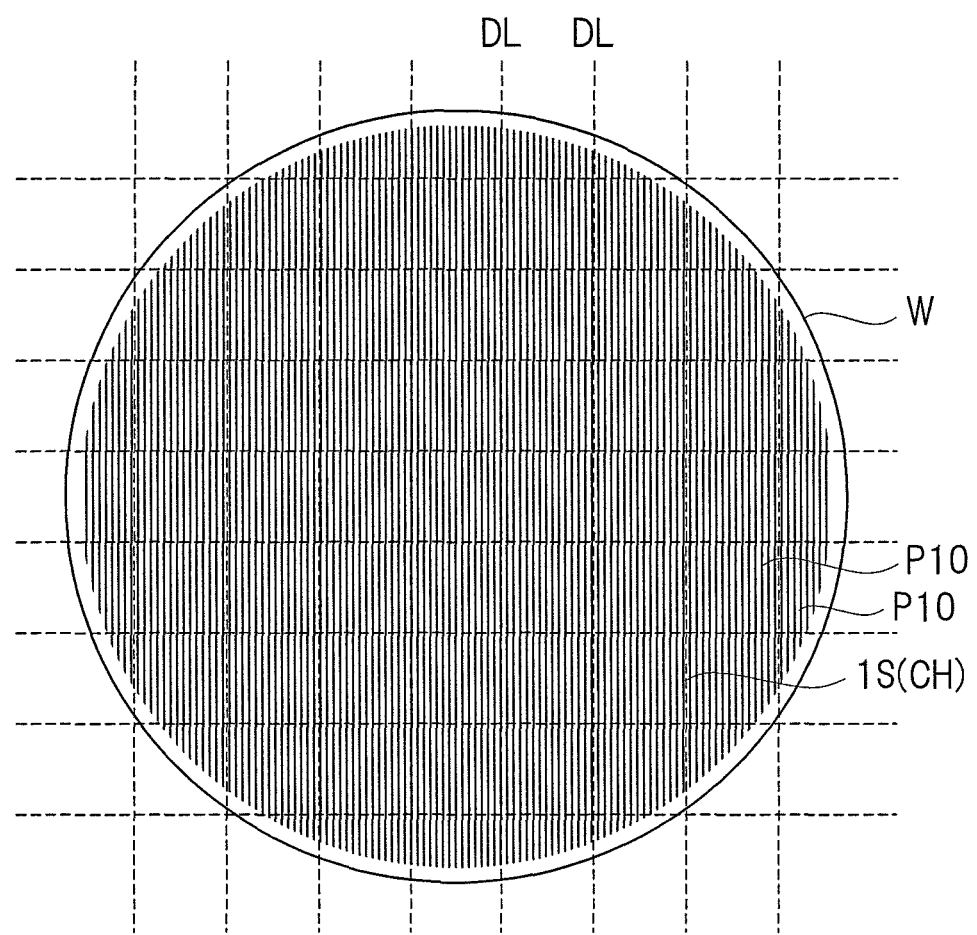
FIG. 23 is a plan view illustrating an optical element in a comparative example of the first embodiment.
Figure 24:
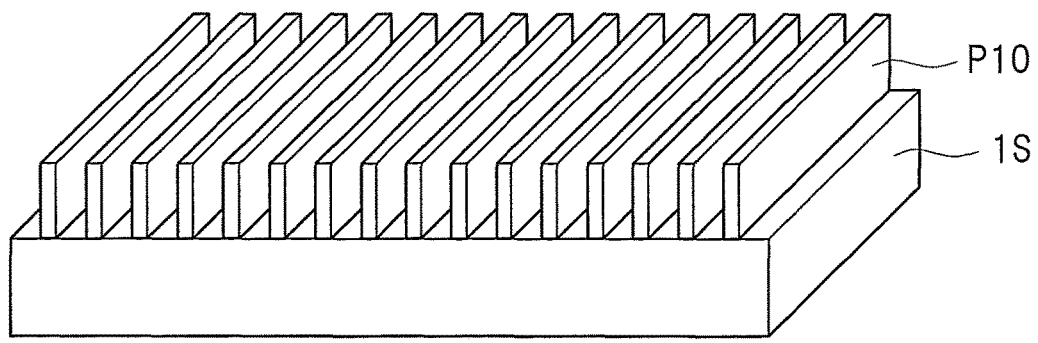
FIGS. 24(A) and 24(B) are perspective views illustrating the optical element in the comparative example of the first embodiment.
Figure 24:
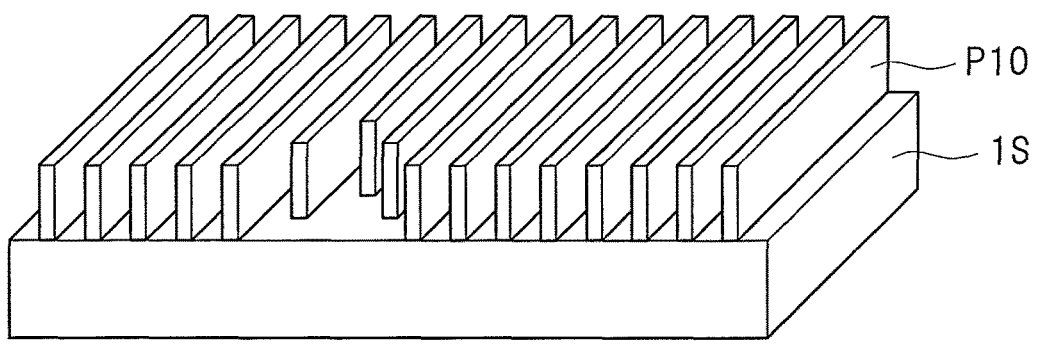

FIG. 23 is a plan view illustrating an optical element in a comparative example of the present embodiment. FIGS. 24(A) and 24(B) are perspective views illustrating the optical element in the comparative example of the present embodiment.

In the optical element in the comparative example illustrated in FIG. 23, a plurality of wires P10 are provided on a substantially entire surface of a wafer substrate W by using a two-beam interference exposure method. The two-beam interference exposure method is a technique in which two light fluxes (laser light beams) are made to cross so as to form a certain angle therebetween, thereby forming interference fringes at a crossing portion, and a photoresist film on the wafer substrate W is exposed by a light intensity distribution of the interference fringes. A minute periodic pattern can be formed on an entire surface of a relatively large wafer substrate W by using such interference fringes.

However, when the wafer substrate W on which the wires P10 extending beyond the chip region CH are formed like this is diced into individual pieces, side surfaces (cross sections) of the wires P10 are exposed at an end of the substrate (chip region) 1S as illustrated in FIG. 24(A). Also, depending on cases, the wires P10 are nicked due to the stress during dicing, and defective portions of the wires P10 are produced at the end of the substrate (chip region) 1S as illustrated in FIG. 24(B).

Figure 25:
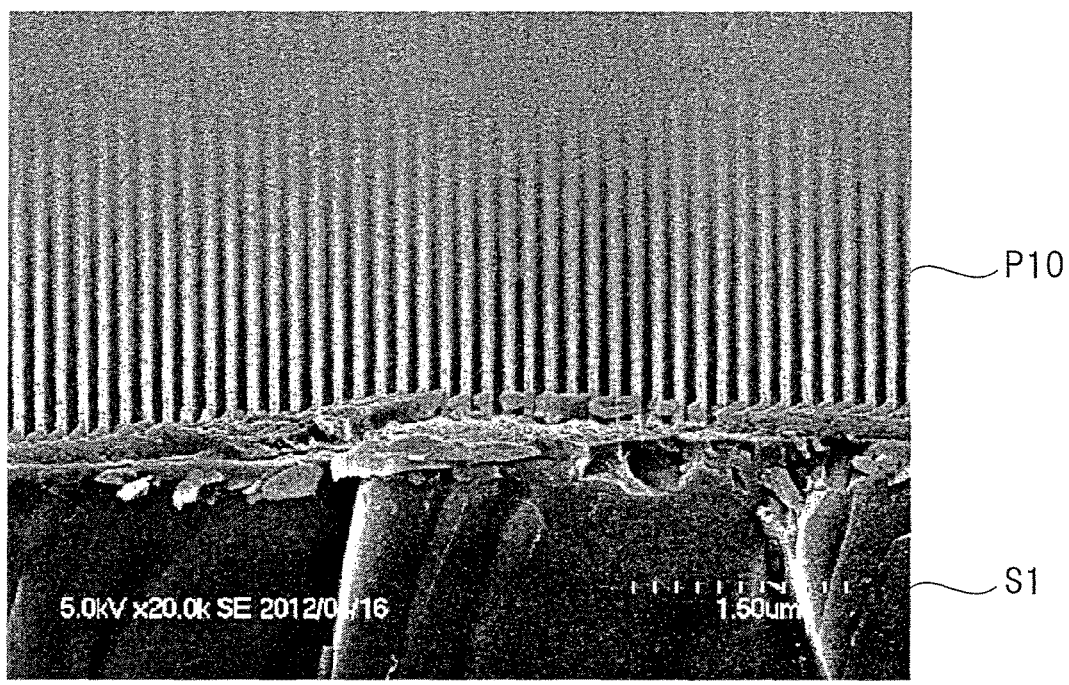
FIG. 25 is a SEM picture of the optical element in the comparative example experimentally produced by the inventors of the present invention.

FIG. 25 is a SEM (Scanning Electron Microscope) picture of the optical element in the comparative example experimentally produced by the inventors of the present invention. As illustrated in FIG. 25, when the wires P10 extending beyond the chip region CH are diced, deformation and nicking of the wires P10 are confirmed in cut portions of the wires P10.

Figure 26:
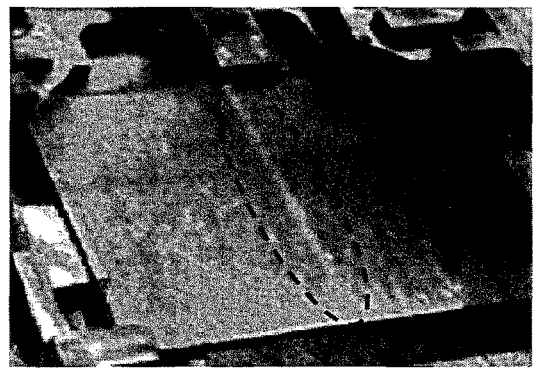
FIGS. 26(A) to 26(C) are diagrams (pictures) illustrating the optical element in the comparative example experimentally produced by the inventors of the present invention.
Figure 26:
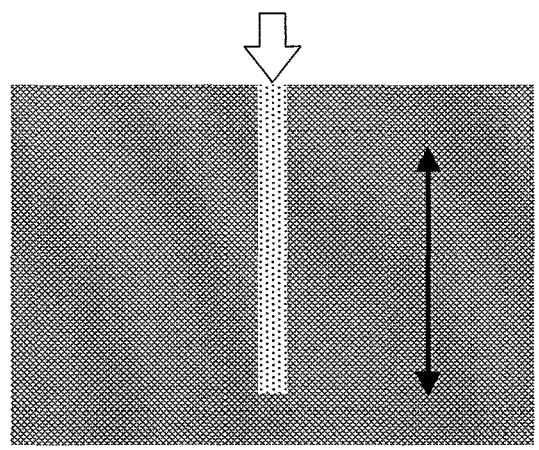
Figure 26:
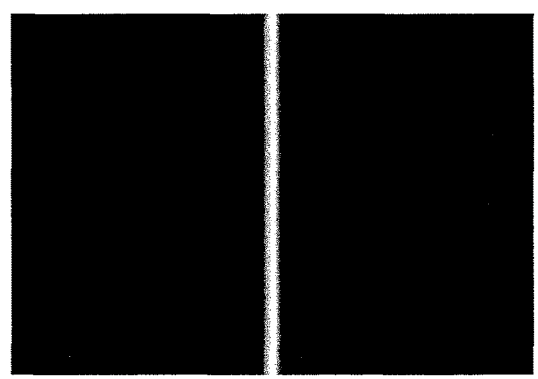

Further, when the optical element in the comparative example experimentally produced by the inventors of the present invention is applied to an optical device, a deteriorated portion of the optical element (polarizing filter) is confirmed. FIG. 26 is a diagram (picture) illustrating the optical element in the comparative example experimentally produced by the inventors of the present invention. FIG. 26(A) is a picture of a surface of the optical element. FIG. 26(B) is a plan view schematically illustrating a state of the deterioration. FIG. 26(C) illustrates a screen of the optical device (liquid crystal projector) incorporating the optical element in the comparative example.

As illustrated in FIG. 26(A), in the optical element in the comparative example, a discolored portion can be confirmed in an extending direction of the wires (in a direction indicated by an arrow in the picture). When a cause of such a discoloration is studied, a degradation mechanism illustrated in FIG. 26(B) can be considered. More specifically, in the configuration of the optical element in the comparative example, since the plurality of wires P10 are arranged at predetermined intervals at the end of the substrate 1S as illustrated in FIG. 24(A), water which has adhered to an end of the optical element due to dew condensation or the like is diffused so as to spread in a longitudinal direction of the wires P10 by a capillary phenomenon. It is considered that metal (for example, Al) constituting the wires P10 is corroded due to such water.

For example, when the above-mentioned corrosion (deterioration) occurs in the wires P10 in the optical element (polarizing filter) incorporated in an optical device such as the liquid crystal projector, an image display characteristic is degraded. For example, as illustrated in FIG. 26(C), it is confirmed that a light extinction function is degraded and light cannot be sufficiently extinguished in a portion where the wires P10 are deteriorated.

Furthermore, a base material such as a glass substrate (quartz glass, optical glass) is exposed in the defective portions of the wires P10 (see FIG. 24(B)). Glass generally has a hydrophilic property, and water more easily adheres to the glass than to a metal (generally having a water-repellent property). Accordingly, the defective portions of the wires P10 are likely to be a starting portion of absorption of water by the above-mentioned capillary phenomenon. Thus, the possibility that water enters from the defective portions of the wires P10 is high. When Al is used as a metal constituting the wire P10, $Al_2O_3$ (aluminum oxide) which is a natural oxide film may be formed to have a film thickness of 5 nm or less on a surface of the Al. Since this $Al_2O_3$ has a hydrophilic property, when Al is used as a metal constituting the wire P10, the possibility that water enters is further increased.

On the other hand, in the present embodiment, the plurality of wires P10 are arranged so that the respective ends are spaced apart from the end of the substrate (chip region)

1S as described above. More specifically, the wires P10 are configured so as not to extend beyond the chip region CH, so that deformation and nicking of the wires P10 can be prevented. In particular, even when stress caused by the dicing saw is applied to the wafer substrate W in the dicing process, the plurality of wires P10 are not deformed and nicked due to the dicing saw.

Further, in the optical element according to the present embodiment, since the protruding portions (P20, P21) are provided between the ends of the wires P10 and the end of the substrate 1S (in the peripheral region 2A), it is possible to prevent water from entering (penetrating) the wire-grid region 1A. More specifically, even when an exposed region of the substrate 1S having a hydrophilic property is increased by arranging the wires P10 so that their respective ends are spaced apart from the end of the substrate (chip region) 1S, it is possible to prevent water from entering (penetrating) the wire-grid region 1A by providing the protruding portions (P20, P21) in that region.

In addition, in the optical element according to the present embodiment, by using the nanoimprint method, the wires P10, the protruding portions P20, and the protruding portion P21 can be formed with a high throughput and high accuracy.

Figure 27:
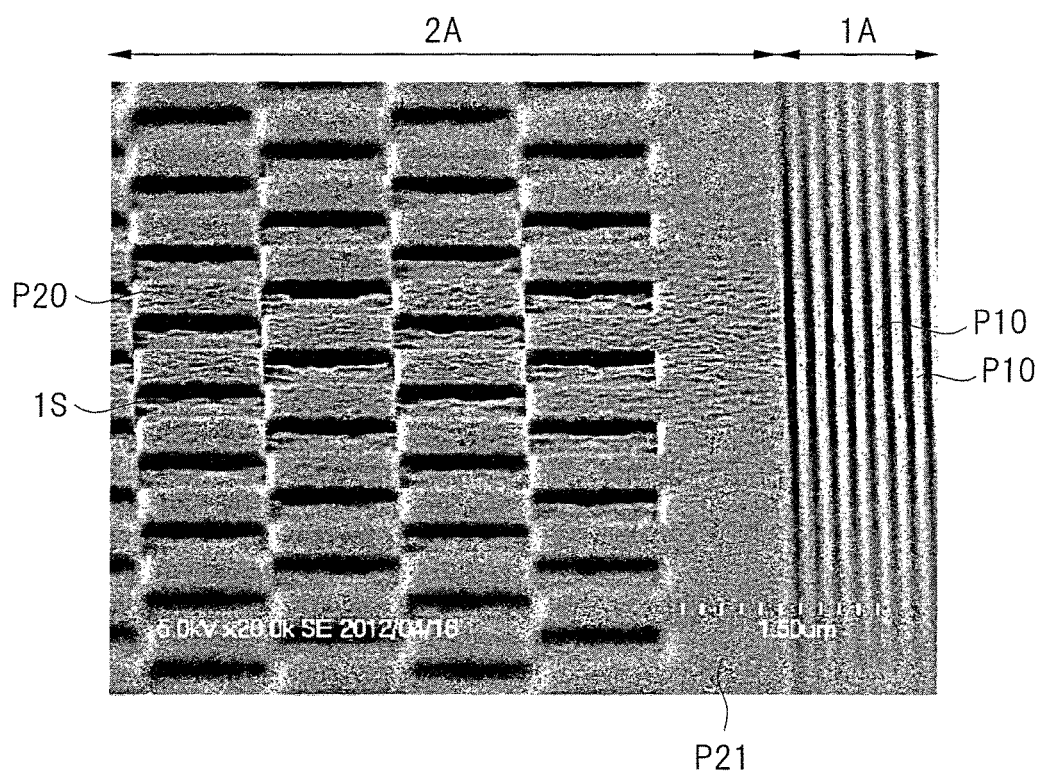
FIG. 27 is a SEM picture of the optical element according to the first embodiment experimentally produced by the inventors of the present invention.

FIG. 27 is a SEM picture of the optical element according to the present embodiment experimentally produced by the inventors of the present invention. The height (thickness) of the wires P10 is set to 150 nm, the width D1 of the wires P10 is set to 55 nm, and the interval between the wires P10 (width D2 of the space S) is set to 150 nm (see FIG. 2). As illustrated in FIG. 27, it is confirmed that a highly accurate pattern (wires P10, protruding portions P20, and protruding portion P21) can be satisfactorily formed by using the nanoimprint method. In the SEM picture illustrated in FIG. 27, the substrate 1S is observed and photographed while being inclined by approximately 15 degrees. Accordingly, out-of-focus portions are seen in an upper part and a lower part of the SEM picture, but these are not defective formation of the wires P10 or the like.

Figure 30:
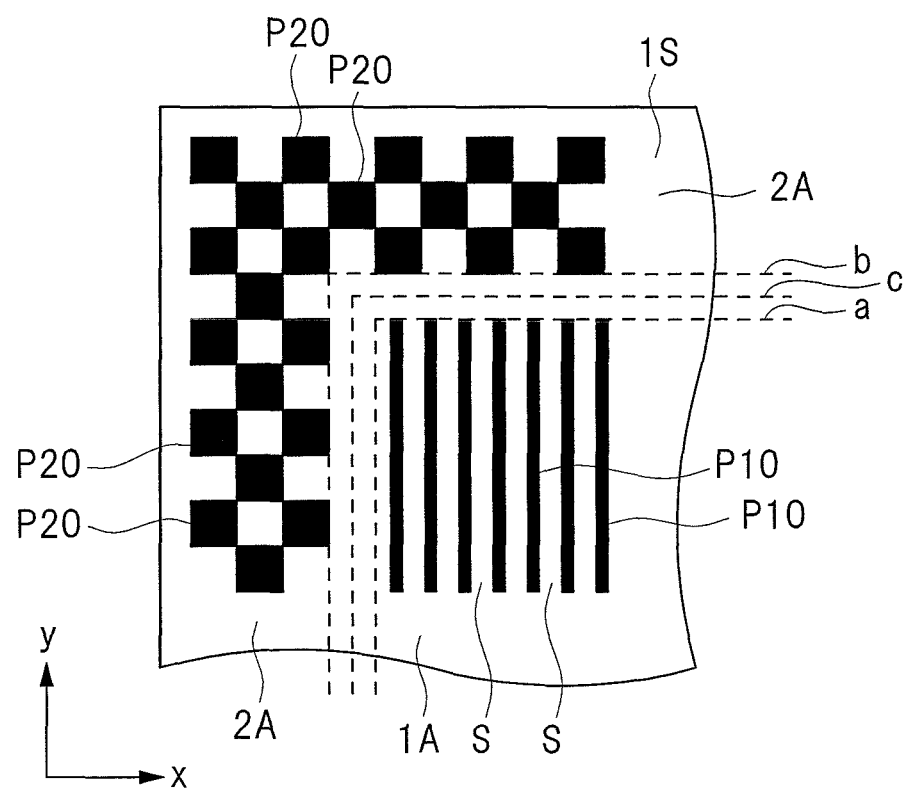
FIG. 30 is a plan view for describing a boundary between a wire-grid region 1A and a peripheral region 2A.

Although the protruding portion (guard ring) P21 is provided so as to surround the wire-grid region 1A in the present embodiment, the protruding portion P21 may be omitted (see, for example, FIG. 30).

Although the nanoimprint method has been used in the above-mentioned process, a photolithography method for exposing and developing resist resin (photoresist) by using a stepper may be used. In this case, for example, reticles in which patterns corresponding to the wires P10 and the protruding portions P20 and P21 are drawn are exposed and transferred onto the photoresist on the metal layer ML. Thereafter, a photoresist mask is formed by performing development process, and the metal layer ML is etched with using the photoresist mask.

Note that the nanoimprint method (contact transfer) is useful in that the optical element can be formed at relatively lower cost in the manufacturing processes in comparison with the photolithography method (noncontact transfer).

Second Embodiment

In the present embodiment, a formation area (formation region) of protruding portions (P20, P21) in the peripheral region 2A will be described.

Figure 28:
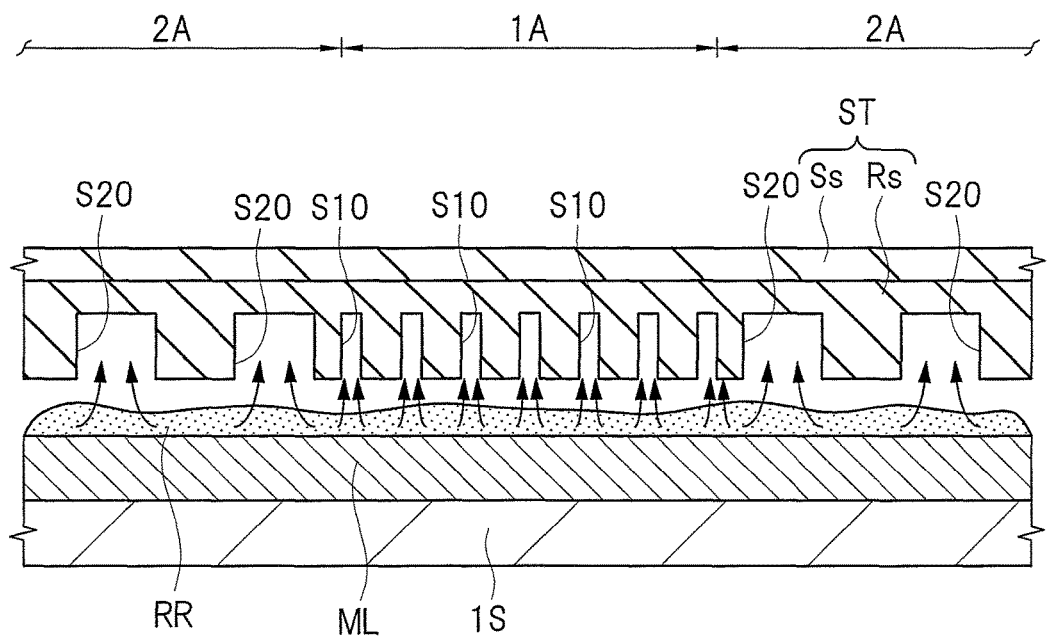
FIG. 28 is a cross-sectional view illustrating the manufacturing process of an optical element according to the second embodiment.

FIG. 28 is a cross-sectional view illustrating the manufacturing process of an optical element according to the present embodiment. As described with reference to FIG. 16, FIG. 17 and others in the first embodiment, the stamper ST is arranged on the resist resin RR to fill the inner parts of grooves (S10, S20, S21) in the stamper ST with the resist resin RR.

At this time, as illustrated in FIG. 28, the inner parts of the grooves (S10, S20, S21) in the stamper ST are filled with the resist resin RR positioned close to the grooves. More specifically, a resist flow phenomenon in which the resist resin RR moves along the surface of the substrate 1S occurs, and the inner parts of the grooves (S10, S20, S21) are filled with the resist resin RR. Since a moving distance of the resist resin RR is several micrometers to several ten micrometers, respective area ratios between the grooves (region to which the resist resin RR is moved to have a large thickness) and the region other than the grooves (region from which the resist resin RR is moved to have a small thickness) are preferably close to each other in the wire-grid region 1A and the peripheral region 2A.

In other words, when the area ratios of the grooves (S10, S20, S21) are close to each other in the wire-grid region 1A and the peripheral region 2A, the inner parts of the grooves (S10, S20, S21) can be filled with the resist resin RR in a more balanced manner.

As described in detail in the first embodiment, the grooves (S10, S20, S21) respectively correspond to the wires P10, the protruding portions P20, and the protruding portion P21.

Accordingly, a ratio of a formation area of the wires P10 in the wire-grid region 1A and a ratio of a formation area of the protruding portions P20 and the protruding portion P21 in the peripheral region 2A are preferably close to each other.

The ratio of the formation area of the wires P10 in the wire-grid region 1A ($AR1=A_{P10}/A_{1A}$) is preferably close to the ratio of the formation area of the protruding portions (P20, P21) in the peripheral region 2A ($AR2=A_{P2X}/A_{2A}$).

Concretely, with respect to the ratio of the formation area of the wires P10 in the wire-grid region 1A ($AR1=A_{P10}/A_{1A}$) and the ratio of the formation area of the protruding portions (P20, P21) in the peripheral region 2A ($AR2=A_{P2X}/A_{2A}$), AR2 is preferably set to 0.8×AR1 or more and 1.2×AR1 or less ($0.8 AR1 \leq AR2 \leq 1.2 AR1$). Also, the ratio of the formation area of the wires P10 in the wire-grid region 1A ($AR1=A_{P10}/A_{1A}$) and the ratio of the formation area of the protruding portions (P20, P21) in the peripheral region 2A ($AR2=A_{P2X}/A_{2A}$) are more preferably made substantially equal to each other ($AR1 \approx AR2$).

For example, in FIG. 5 in the first embodiment, AR2 can be set to approximately 45% to 55% by adjusting one side of the shape of the protruding portions P20 and the width of the protruding portion P21. Also, AR1 is approximately 25 to 40%. In the present embodiment, "shape" represents a shape in a plan view seen from the top.

In FIG. 5 in the first embodiment, a moving distance of the resist resin RR can be adjusted to the same extent in a horizontal direction and a vertical direction of the substrate 1S by making the protruding portions P20 have a two-dimensional pattern like a checkerboard pattern, and the transfer accuracy of the pattern (two-dimensional pattern) onto the resist resin can be improved.

Figure 29:
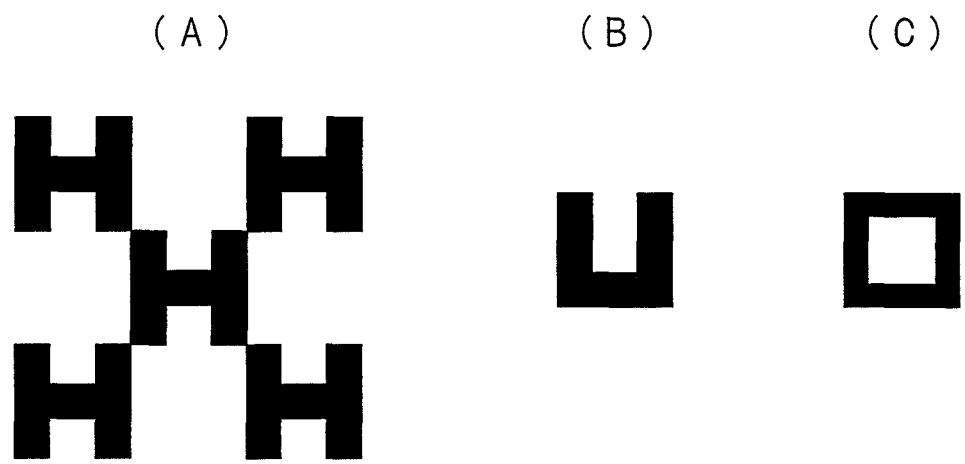
FIGS. 29(A) to 29(C) are plan views respectively illustrating shapes of a protruding portion in a peripheral region in the optical element according to the second embodiment.

Here, in order to further reduce AR2 to be closer to AR1, the shape of the protruding portion P20 may be changed to shapes illustrated in FIG. 29. FIGS. 29(A) to 29(C) are plan views illustrating shapes of protruding portion in the peripheral region in the optical element according to the present embodiment.

For example, as illustrated in FIG. 29(A), the shape of the protruding portion P20 (shape in a plan view seen from the top) may be an H shape. By cutting out a part of the shape of the protruding portion P20 (substantially regular tetragon) illustrated in FIG. 5 like this, the ratio of the formation area of the protruding portions (P20, P21) in the peripheral region 2A (AR2=$A_{P2X}/A_{2A}$) can be reduced. Also, as illustrated in FIG. 29(B), the shape of the protruding portion P20 may be a shape (U shape) obtained by providing a notched portion (blank portion in the figure) along one side of the shape of the protruding portion P20 (substantially regular tetragon) illustrated in FIG. 5. Also, as illustrated in FIG. 29(C), the shape of the protruding portion P20 may be a shape (frame shape) obtained by providing a notched portion (blank portion in the figure) at the center of the shape of the protruding portion P20 (substantially regular tetragon) illustrated in FIG. 5.

Here, a boundary between the wire-grid region 1A and the peripheral region 2A will be described below. FIG. 30 is a plan view for describing the boundary between the wire-grid region 1A and the peripheral region 2A, and corresponds to a figure obtained by omitting the protruding portion (guard ring) P21 illustrated in FIG. 5.

This boundary needs not to be clearly limited. For example, a line a in FIG. 30 may be used as the boundary. More specifically, an X line which connects the ends of the wires P10 in a y direction and a position (Y line) obtained by adding an interval (space) between the wires P10 to the outermost wire P10 may be used as the above-mentioned boundary.

Also, a line b in FIG. 30 may be used as the boundary. More specifically, an X line and a Y line which connect the ends of the protruding portions P20 positioned on the innermost side among the protruding portions P20 may be used as the above-mentioned boundary.

Also, a line c in FIG. 30 may be used as the boundary. More specifically, a center line between the line a and the line b may be used as the above-mentioned boundary.

As described above, AR1 and AR2 may be adjusted by using any one of the above-mentioned lines a to c as the boundary and using a region inside the boundary as the wire-grid region 1A and using a region outside the boundary (up to the end of the substrate 1S or chip region CH) as the peripheral region 2A.

Thus, according to the present embodiment, the wires P10, the protruding portions P20, and the like can be formed with high accuracy by adjusting the ratio of the formation area of the wires P10 in the wire-grid region 1A and the ratio of the formation area of the protruding portions P20 and the like in the peripheral region 2A. More specifically, the inner parts of the grooves (S10, S20, and others) in the stamper ST can be filled with the resist resin RR in a balanced manner. Accordingly, the pattern accuracy of the resist resin RR is improved, and the etching accuracy of the metal layer ML is further improved. As a result, the wires P10, the protruding portions P20 and the like can be formed with high accuracy.

Third Embodiment

In the present embodiment, an example of a shape (shape in a plan view seen from the top) and a layout (arrangement) of protruding portions (P20) in the peripheral region 2A will be described.

Figure 31:
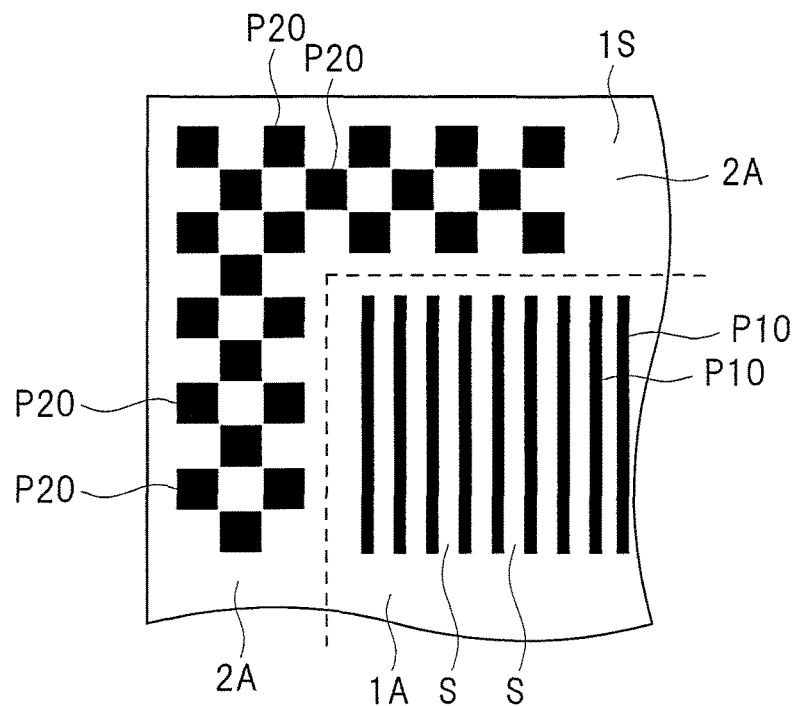
FIGS. 31(A) and 31(B) are plan views illustrating a first example and a second example of a peripheral region in an optical element according to the third embodiment.
Figure 31:
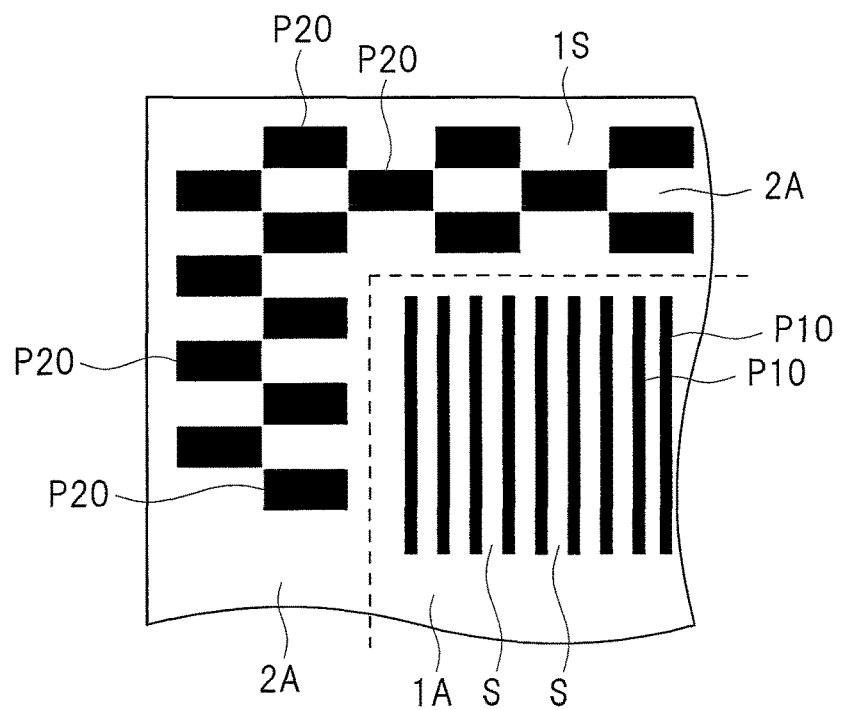

FIGS. 31(A) and 31(B) are plan views respectively illustrating a first example and a second example of a peripheral region in an optical element according to the present embodiment. A broken line in the figures is a boundary line between the wire-grid region 1A and the peripheral region 2A.

As illustrated in FIG. 31(A), in the first example of the present embodiment, a shape (shape in a plan view seen from the top) of the protruding portions (P20) is substantially square. Here, the protruding portions P20 are alternately arranged (alternate arrangement, staggered arrangement, checkerboard arrangement) like the first embodiment illustrated in FIG. 5. However, although the protruding portions P20 adjacent to each other are arranged so that their respective ends overlap each other in the case illustrated in FIG. 5, gaps exist between the ends of the protruding portions P20 adjacent to each other in FIG. 31(A).

By arranging the protruding portions P20 so as to have a two-dimensional pattern such as a checkerboard pattern in this manner, a moving distance of the resist resin RR can be adjusted to the same extent in a horizontal direction and a vertical direction of the substrate 1S. As a result, the transfer accuracy of the pattern (two-dimensional pattern) onto the resist resin can be improved. Also, a stamper can be relatively easily formed by making the shape of the protruding portions (P20) substantially square.

In the second example of the present embodiment illustrated in FIG. 31(B), a shape (shape in a plan view seen from the top) of the protruding portions (P20) is substantially rectangular (substantially oblong). In this case, respective long sides of the shape of the protruding portions (P20) are laid out in a direction crossing an extending direction of the wires P10. Also in this second example, the protruding portions P20 are alternately arranged (alternate arrangement, staggered arrangement, checkerboard arrangement). Also, gaps are provided between the ends of the protruding portions P20 adjacent to each other.

By making the shape of the protruding portions (P20) rectangular and laying out the respective long sides in the direction crossing the extending direction of the wires P10 in this manner, entrance (penetration) of water into spaces between the wires P10 can be effectively reduced. Also, by making the shape of the protruding portions (P20) substantially rectangular, the stamper can be relatively easily formed.

Figure 32:
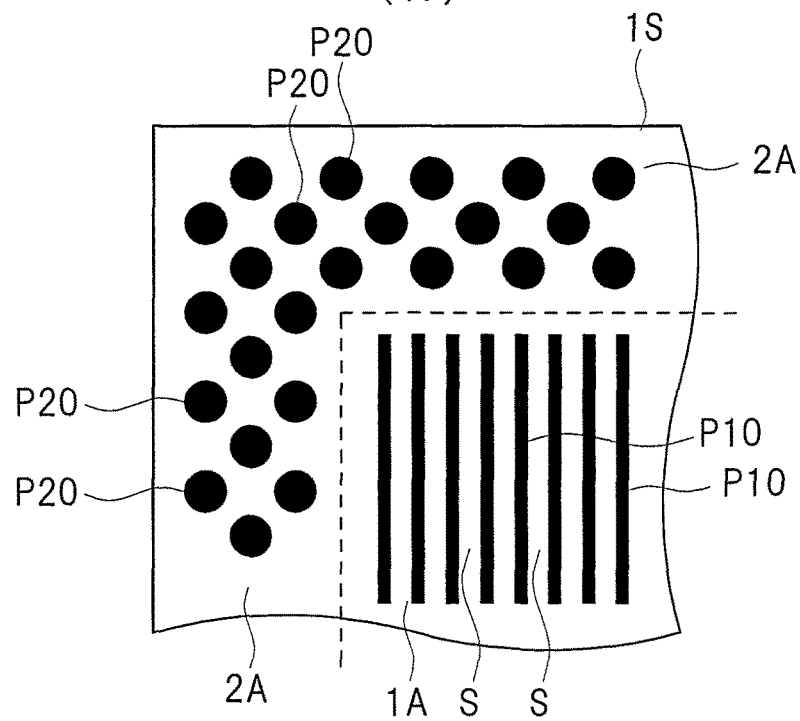
FIGS. 32(A) and 32(B) are plan views respectively illustrating a third example and a fourth example of the peripheral region in the optical element according to the third embodiment.
Figure 32:
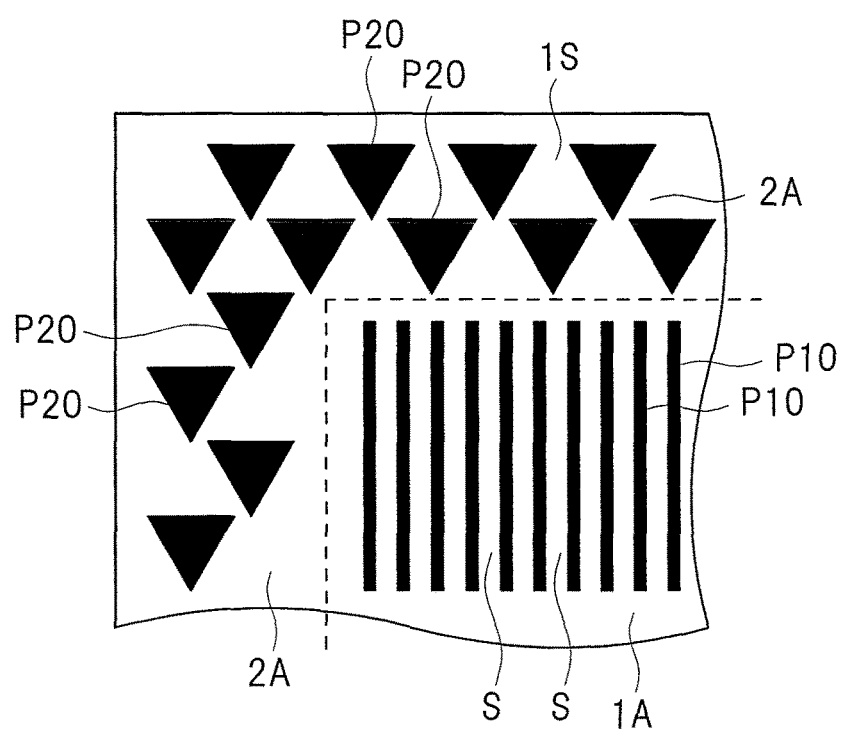

FIGS. 32(A) and 32(B) are plan views respectively illustrating a third example and a fourth example of the peripheral region in the optical element according to the present embodiment. A broken line in the figures is a boundary line between the wire-grid region 1A and the peripheral region 2A.

As illustrated in FIG. 32(A), in the third example of the present embodiment, a shape (shape in a plan view seen from the top) of the protruding portions (P20) is substantially circular. Also in this third example, the protruding portions P20 are alternately arranged (alternate arrangement, staggered arrangement, checkerboard arrangement). Also, gaps exist between the ends of the protruding portions P20 adjacent to each other. The shape of the protruding portions (P20) may be made elliptical.

When the shape of the protruding portions (P20) is made circular or elliptical in this manner, the flow resistance of surplus resist resin flowing on the substrate 1S without entering the inner parts of the grooves decreases. Therefore, uniformity of the film thickness of the resist resin remaining in a region other than the grooves (region from which the resist resin RR is moved to have a small thickness) increases, with the result that the height of the resist resin RR can be made uniform.

In the fourth example of the present embodiment illustrated in FIG. 32(B), a shape (shape in a plan view seen from the top) of the protruding portions (P20) is substantially equilateral triangular. In this case, respective one sides of the shape of the protruding portions (P20) are laid out in a direction crossing the extending direction of the wires P10.

Also in this fourth example, the protruding portions P20 are alternately arranged (alternate arrangement, staggered arrangement, checkerboard arrangement). Also, gaps are provided between the ends of the protruding portions P20 adjacent to each other.

By making the shape of the protruding portions (P20) triangular and laying out the respective one sides thereof in the direction crossing the extending direction of the wires P10 in this manner, entrance (penetration) of water into spaces between the wires P10 can be effectively reduced. Also, by making the shape of the protruding portions (P20) triangular, fluidity of resist resin toward the end of the substrate 1S from the wire-grid region 1A increases. As a result, the height of the resist resin RR can be made uniform.

As illustrated in the above-mentioned first example to fourth example, the shape (shape in a plan view seen from the top) of the protruding portions (P20) can be changed in various manners. Also, gaps may be provided between the ends of the protruding portions (P20) as described above. Further, the protruding portions (P20) may be laid out so that the respective ends thereof are brought into contact with or connected to one another (see FIG. 5).

When the protruding portions (P20) are arranged so that the respective ends thereof are brought into contact with or connected to one another, a protective property against entrance of water is enhanced. On the other hand, in the layout (arrangement) in which gaps exist between the ends of the protruding portions (P20), the ratio of the formation area of the protruding portions (P20 and others) in the peripheral region 2A ($AR2=A_{P2X}/A_{2A}$) can be easily adjusted by adjusting the size of the gaps.

Figure 33:
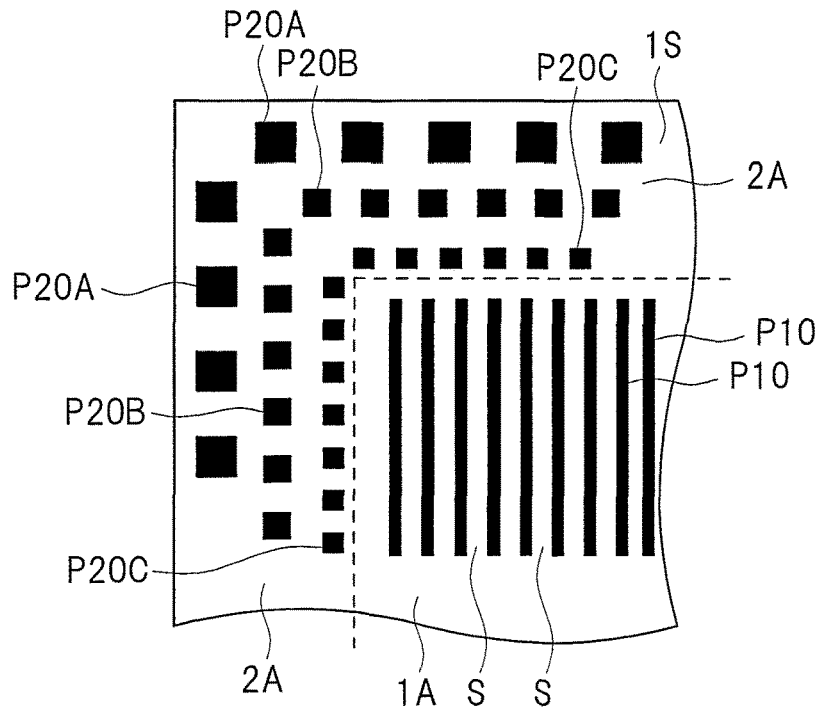
FIGS. 33(A) and 33(B) are plan views respectively illustrating a fifth example and a sixth example of the peripheral region in the optical element according to the third embodiment.
Figure 33:
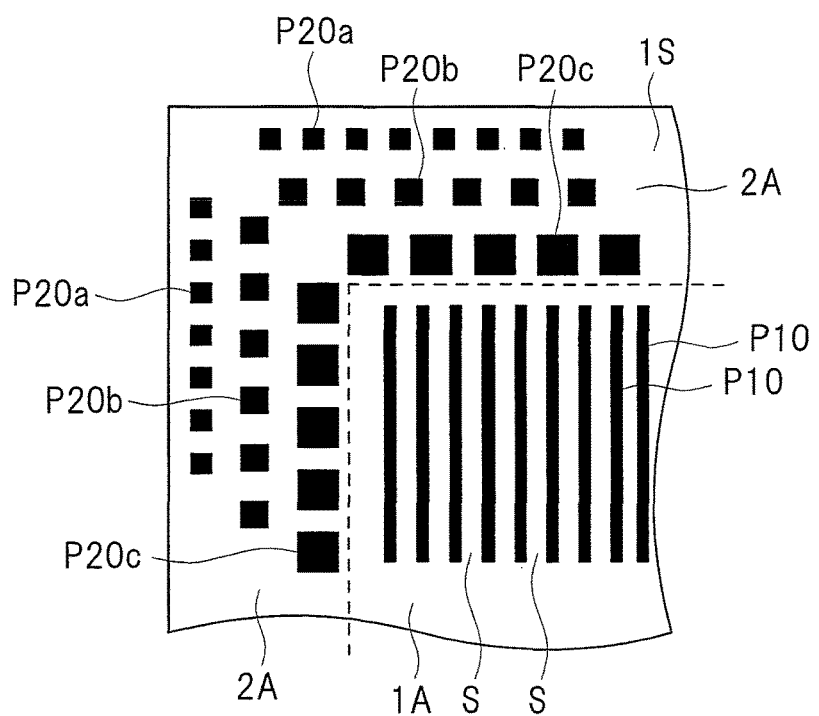

FIGS. 33(A) and 33(B) are plan views respectively illustrating a fifth example and a sixth example of the peripheral region in the optical element according to the present embodiment. A broken line in the figures is a boundary line between the wire-grid region 1A and the peripheral region 2A.

As illustrated in FIG. 33(A), in the fifth example of the present embodiment, a shape (shape in a plan view seen from the top) of the protruding portions (P20) is substantially square.

In this fifth example, triple rows of the protruding portions (P20) are arranged so as to surround the wire-grid region 1A. The protruding portions (P20) are laid out so that the respective sizes (one sides of substantially square shape) thereof sequentially decrease from the protruding portions (P20A) constituting the outermost row of the triple rows to the protruding portions (P20C) constituting the innermost row of the triple rows. In this case, fluidity of the resist resin increases toward the end of the substrate 1S from the wire-grid region 1A, and the height of the resist resin RR can be made uniform.

In the sixth example illustrated in FIG. 33(B), a shape (shape in a plan view seen from the top) of the protruding portions (P20) is substantially square, and triple rows of the protruding portions (P20) are arranged so as to surround the wire-grid region 1A like the fifth example. In the sixth example, contrary to those in the fifth example, the protruding portions (P20) are laid out so that the respective sizes (one sides of substantially square shape) thereof sequentially increase from the protruding portions (P20a) constituting the outermost row of the triple rows to the protruding portions (P20c) constituting the innermost row of the triple rows. In this case, a waterproof function can be improved.

Figure 34:
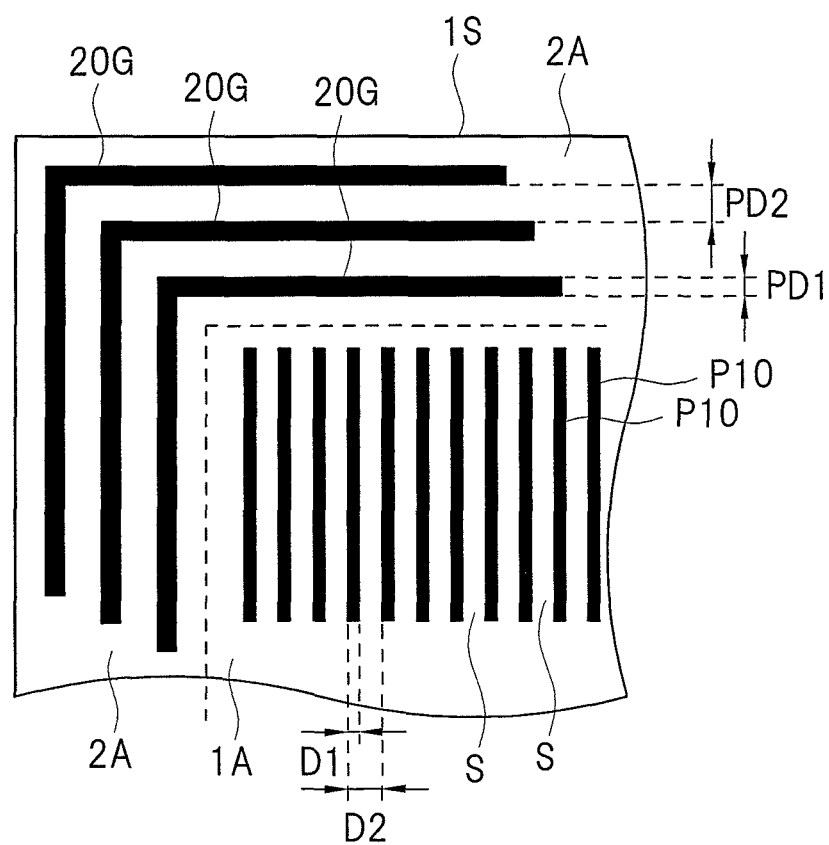
FIG. 34 is a plan view illustrating a seventh example of the peripheral region in the optical element according to the third embodiment.

FIG. 34 is a plan view illustrating a seventh example of the peripheral region in the optical element according to the present embodiment. A broken line in the figure is a boundary line between the wire-grid region 1A and the peripheral region 2A.

As illustrated in FIG. 34, in the seventh example of the present embodiment, triple protruding portions (guard rings) 20G are arranged so as to surround the wire-grid region 1A. The width of each of the triple protruding portions (guard rings) 20G is PD1, and the space between the protruding portions (guard rings) 20G is PD2.

The protruding portions (guard rings) 20G surrounding the wire-grid region 1A may be provided in this manner. By the protruding portions (guard rings) 20G, entrance (penetration) of water into the wire-grid region 1A can be prevented. Also, by providing multiple protruding portions (guard rings) 20G, the function of preventing the entrance of water can be improved.

In this case, a ratio (AR2) of the formation area of the protruding portions (20G) in the peripheral region 2A can be easily adjusted by adjusting the width PD1 of the protruding portions (guard rings) 20G and the space PD2 between the protruding portions (guard rings) 20G.

Note that it is needless to say that the above-mentioned first to seventh examples are given by way of examples, and the shape and the layout can be changed in various manners. Further, it is also possible to combine the protruding portions (guard rings) P21 in the seventh example and the first embodiment (FIG. 6) with the configurations in the first to sixth examples.

As described above, a waterproof effect can be further improved by combining the protruding portions (guard rings) P21 having a one-dimensional pattern.

Fourth Embodiment

In the second embodiment, the ratio of the formation area of the wires P10 in the wire-grid region 1A ($AR1=A_{P10}/A_{1A}$) and the ratio of the formation area of the protruding portions (P20, P21) in the peripheral region 2A ($AR2=A_{P2X}/A_{2A}$) are adjusted. On the other hand, in the present embodiment, the depths of the grooves (S10, S20 and others) are adjusted, thereby filling inner parts of the grooves (S10, S20, etc.) with the resist resin RR in a balanced manner.

Figure 35:
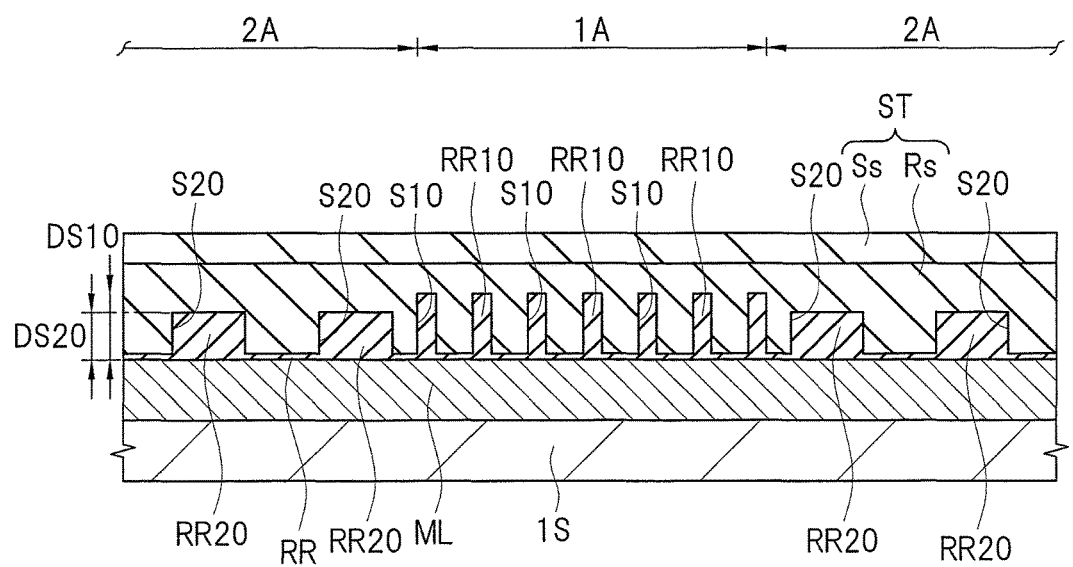
FIG. 35 is a cross-sectional view of a principal part illustrating the manufacturing process of an optical element according to the fourth embodiment.
Figure 36:
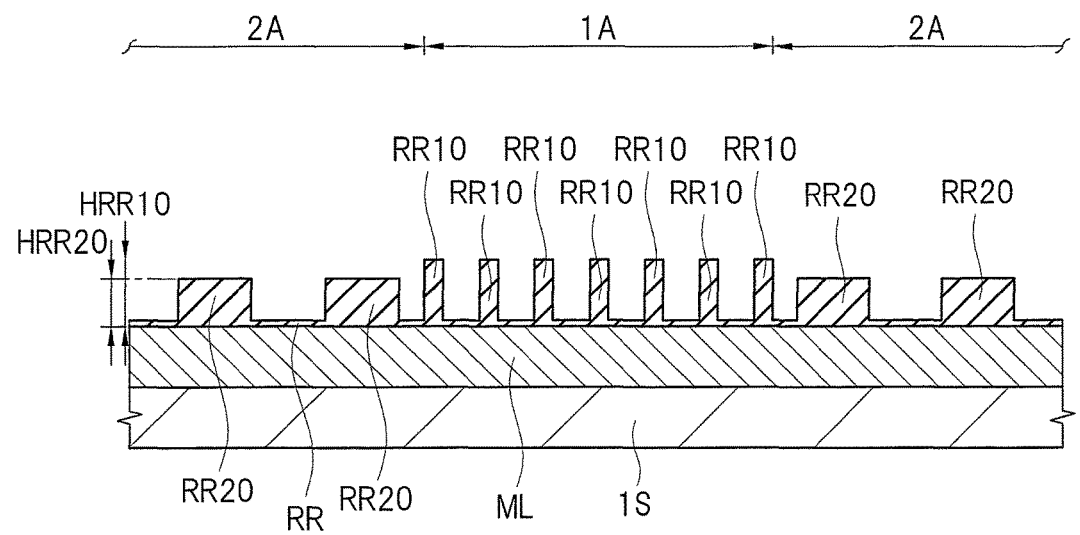
FIG. 36 is a cross-sectional view of a principal part illustrating the manufacturing process of the optical element according to the fourth embodiment continued from FIG. 35.
Figure 37:
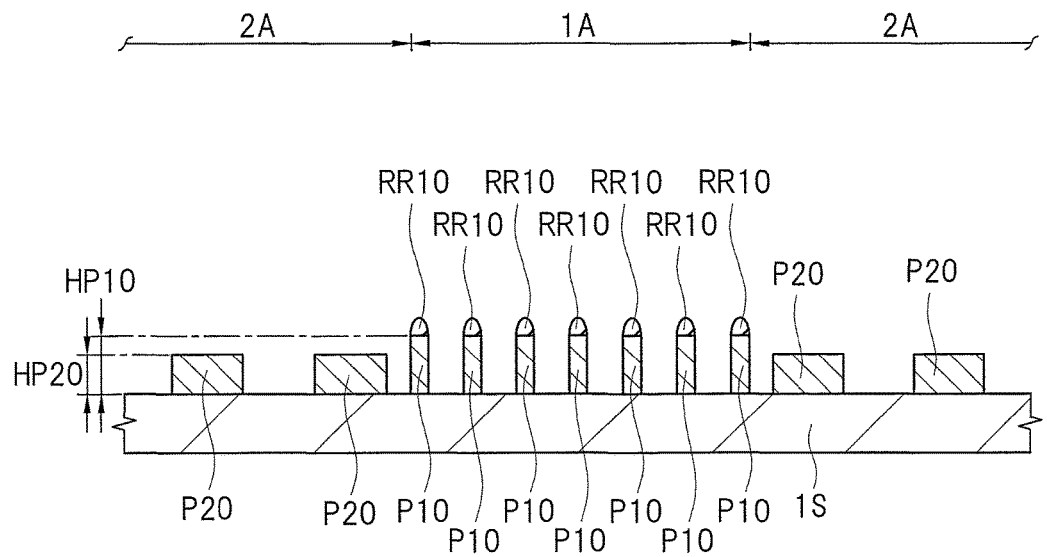
FIG. 37 is a cross-sectional view of a principal part illustrating the manufacturing process of the optical element according to the fourth embodiment continued from FIG. 36.

FIGS. 35 to 37 are cross-sectional views of a principal part illustrating the manufacturing process of an optical element according to the present embodiment. In the cross-sectional view of the principal part, the wire-grid region 1A and the peripheral regions 2A on both sides thereof are schematically illustrated so as to make the description easily understood.

As illustrated in FIG. 35, after the stamper ST is arranged on the resist resin RR to fill the inner parts of the grooves (S10, S20) in the stamper ST with the resist resin RR, the resist resin RR is irradiated with UV light via the stamper ST, thereby curing the resist resin RR.

At this time, as illustrated in the second embodiment, the inner parts of the grooves (S10, S20) in the stamper ST are filled with the resist resin RR positioned close to the grooves. Therefore, in the present embodiment, the depth DS20 of the grooves S20 is set to be smaller than the depth DS10 of the grooves S10 in the stamper ST (DS10>DS20).

Thus, in the present embodiment, the inner parts of the grooves (S10, S20) can be filled with the resist resin RR in a balanced manner by setting the depth DS20 of the grooves S20 to be small and making the total volume of the grooves S20 smaller.

For example, the case where AR2 is approximately 50% and AR1 is approximately 35% in FIG. 30 in the second embodiment will be considered. In such a case, for example, the depth DS20 of the grooves S20 is set to be approximately 80% of the depth DS10 of the grooves S10 in the stamper ST (0.8×DS10=DS20). In this manner, a ratio (VA1=$V_{P10}/A_{1A}$) of the total volume $V_{P10}$ of the grooves S10 to the area ($A_{1A}$) of the wire-grid region 1A and a ratio (VA2=$V_{P20}/A_{2A}$) of a total volume $VP_{20}$ of the grooves S20 to the area ($A_{2A}$) of the peripheral region 2A can be made closer to each other. In other words, a ratio (V1=$V_{P10}/V_{1A}$) of the total volume $V_{P10}$ of the grooves S10 to an application amount ($V_{1A}$) of the resist resin RR to the wire-grid region 1A and a ratio (V2=$V_{P20}/V_{2A}$) of the total volume $V_{P20}$ of the grooves S20 to an application amount ($V_{2A}$) of the resist resin RR to the peripheral region 2A can be made closer to each other. Thus, the inner parts of the grooves (S10, S20) in the stamper ST can be filled with the resist resin RR in a balanced manner. As a result, the pattern accuracy of the resist resin RR is improved, and the etching accuracy of the metal layer ML is further improved. Accordingly, the wires P10 and the protruding portions P20 can be formed with high accuracy.

Note that, when the protruding portion P21 is formed in addition to the protruding portions P20 as described in the first embodiment (FIG. 5), a ratio of a sum ($VP_{2X}$) of the total volume of the grooves S20 and the volume of the groove S21 in the peripheral region 2A may be used.

Next, as illustrated in FIG. 36, the resist resin RR is stripped from the stamper ST (mold release process). At this time, the height (film thickness) HRR20 of projections (resist patterns) RR10 corresponding to the grooves S10 in the stamper ST may be smaller than the height HRR10 of projections RR20 corresponding to the grooves S20.

Next, the metal layer ML is dry-etched with using the processed resist resin RR as a mask (FIG. 37), and the remaining resist resin RR is removed by ashing or others like the first embodiment. Then, the wafer substrate W is diced (cut, scribed) along a dicing line (scribe line) DL into individual pieces (chips) (see FIG. 7). In this manner, the optical element can be formed.

Here, in the etching mentioned above, the height HP20 of the protruding portions P20 may be smaller than the height (film thickness) HP10 of the wires P10 so as to correspond to the remaining film thickness of the resist resin RR on the metal layer ML (see FIG. 37). In other words, surfaces of the protruding portions P20 may be lower than surfaces of the wires P10 (FIG. 37).

As described above, by making a difference in height between the wires P10 in the wire-grid region 1A and the protruding portions P20 in the peripheral region 2A, it becomes easy to recognize the wire-grid region 1A. For example, at the time of alignment in the dicing process of the wafer substrate W, contrast between the wire-grid region 1A and the peripheral region 2A becomes clear, and a center line between the wire-grid regions 1A can be easily recognized as a dicing line (scribe line) DL.

Also in the processes other than the dicing process described above, the alignment of the wafer substrate W can be facilitated based on a boundary portion between the wire-grid region 1A and the peripheral region 2A by using the difference in contrast therebetween.

Fifth Embodiment

Although the case where the height HP20 of the protruding portions P20 becomes smaller than the height (film thickness) HP10 of the wires P10 (see FIG. 30) has been described in the fourth embodiment, the case where the height HP20 of the protruding portions P20 becomes larger than the height (film thickness) HP10 of the wires P10 will be described below in the present embodiment.

FIGS. 38 to 41 are cross-sectional views of a peripheral part illustrating the manufacturing process of an optical element according to the present embodiment. In the cross-sectional view of the principal part, the wire-grid region 1A and the peripheral regions 2A on both sides thereof are schematically illustrated so as to make the description easily understood.

Figure 38:
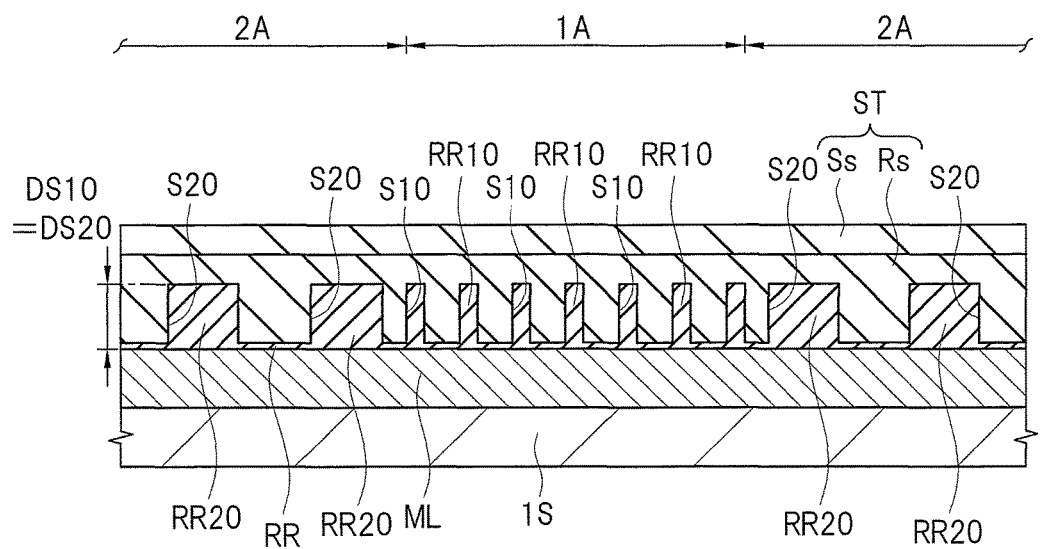
FIG. 38 is a cross-sectional view of a principal part illustrating the manufacturing process of an optical element according to the fifth embodiment.

As illustrated in FIG. 38, after the stamper ST is arranged on the resist resin RR to fill the inner parts of the grooves (S10, S20) in the stamper ST with the resist resin RR, the resist resin RR is irradiated with LW light via the stamper ST, thereby curing the resist resin RR.

In this case, the depth DS10 of the grooves S10 in the stamper ST is substantially equal to the depth DS20 of the grooves S20 (DS10=DS20) like the first embodiment (FIG. 16 and others).

Figure 39:
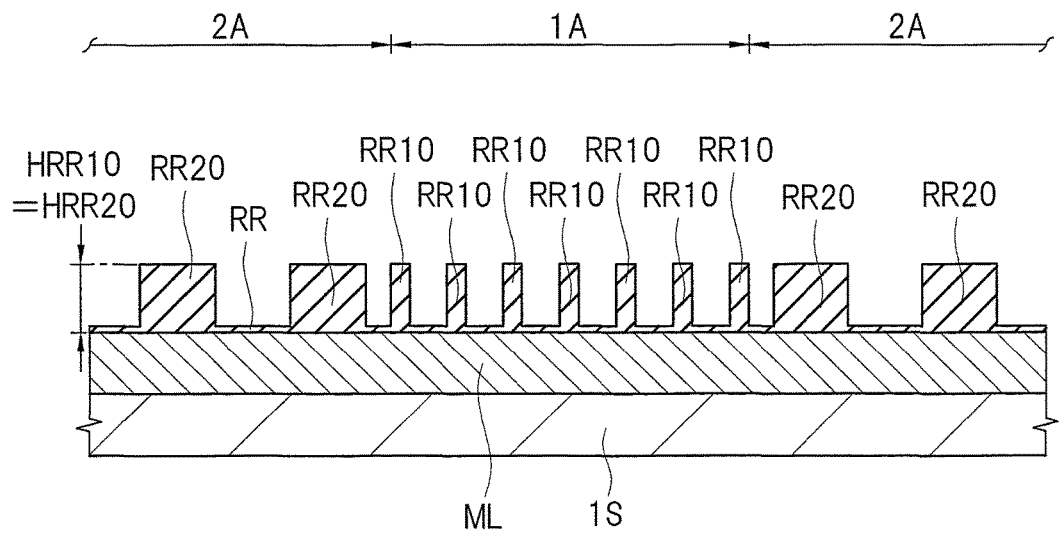
FIG. 39 is a cross-sectional view of a principal part illustrating the manufacturing process of the optical element according to the fifth embodiment continued from FIG. 38.
Figure 40:
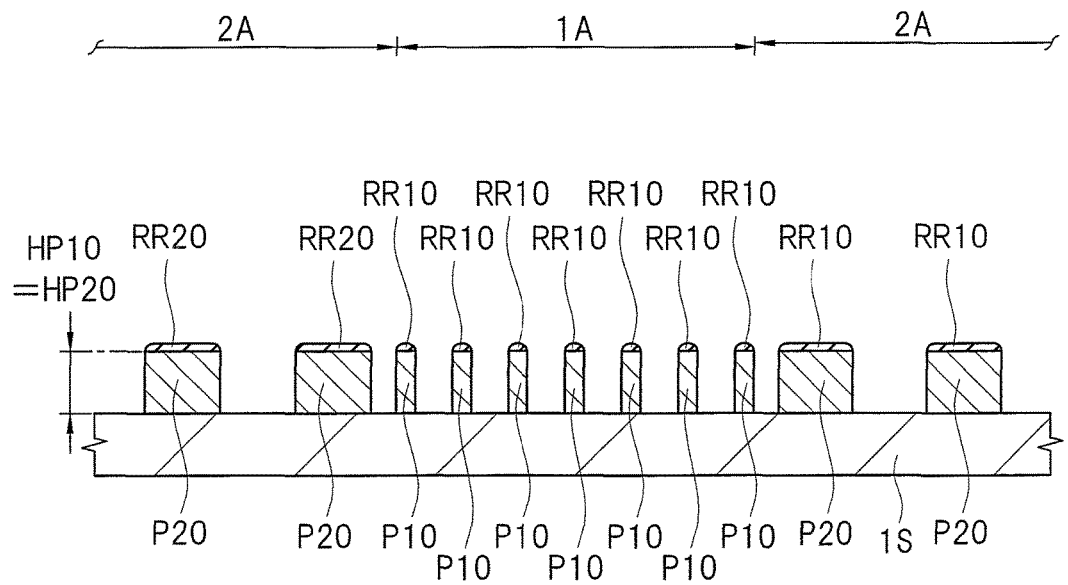
FIG. 40 is a cross-sectional view of a principal part illustrating the manufacturing process of the optical element according to the fifth embodiment continued from FIG. 39.

Next, as illustrated in FIG. 39, the resist resin RR is stripped from the stamper ST (mold release process). At this time, the height (film thickness) HRR10 of the projections (resist patterns) RR10 corresponding to the grooves S10 in the stamper ST is substantially equal to the height HRR20 of the projections RR20 corresponding to the grooves S20 like the first embodiment (FIG. 18 and others).

Next, the metal layer ML is dry-etched with using the processed resist resin RR as a mask (FIG. 40), and is further over-etched. The over-etching mentioned here means the etching continuously performed after the resist resin RR (projections RR10 and RR20) on the metal layer ML (wires P10 and protruding portions P20) is removed by etching. In this over-etching, since the resist resin RR (projections RR10 and RR20) serving as a mask is removed, upper parts of the wires P10 and the protruding portions P20 are etched. At this time, since the width (D1) of the wire P10 is smaller than the width (one side) of the protruding portion P20, the wire P10 is etched more. Therefore, the retreating amount of the upper part of the wire P10 becomes larger, so that the height HP20 of the protruding portion P20 becomes larger than the height (film thickness) HP10 of the wire P10.

Figure 41:
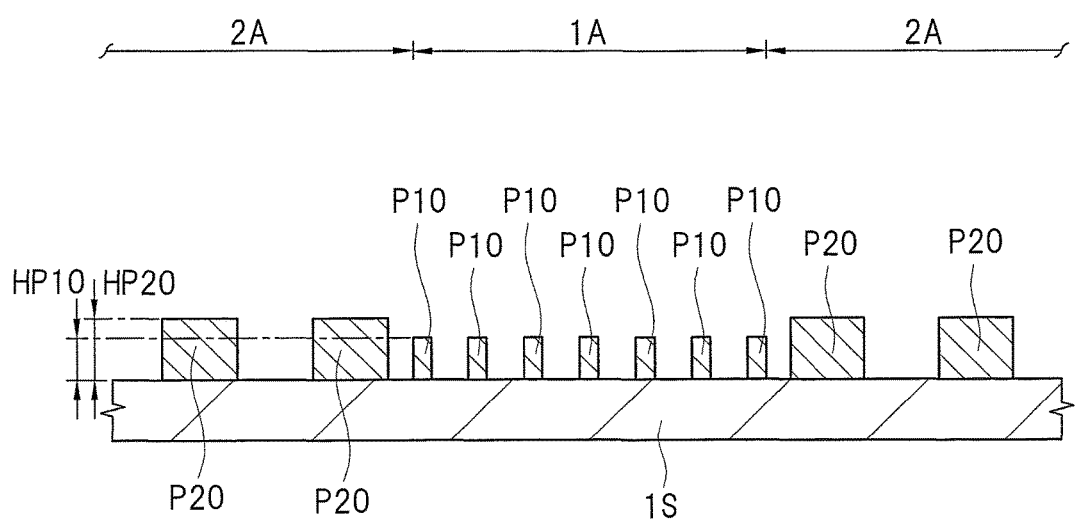
FIG. 41 is a cross-sectional view of a principal part illustrating the manufacturing process of the optical element according to the fifth embodiment continued from FIG. 40.

As described above, the height HP20 of the protruding portion P20 may be larger than the height (film thickness) HP10 of the wire P10 (FIG. 41). In other words, the surface of the wires P10 may be lower than the surface of the protruding portions P20 (FIG. 41).

Also in this case, a difference in height is made between the wires P10 in the wire-grid region 1A and the protruding portions P20 in the peripheral region 2A. Accordingly, the alignment of the wafer substrate W can be facilitated based on a boundary portion between the wire-grid region 1A and the peripheral region 2A by using the difference in contrast therebetween like the fourth embodiment.

Sixth Embodiment

An application example of the optical element (polarizing filter) described in the above-mentioned first to fifth embodiments is not limited, and the optical element is applicable to various optical devices. Among these, a liquid crystal projector which is one of image projection devices is taken as an example of the optical device using the optical element in the description of the present embodiment.

Figure 42:
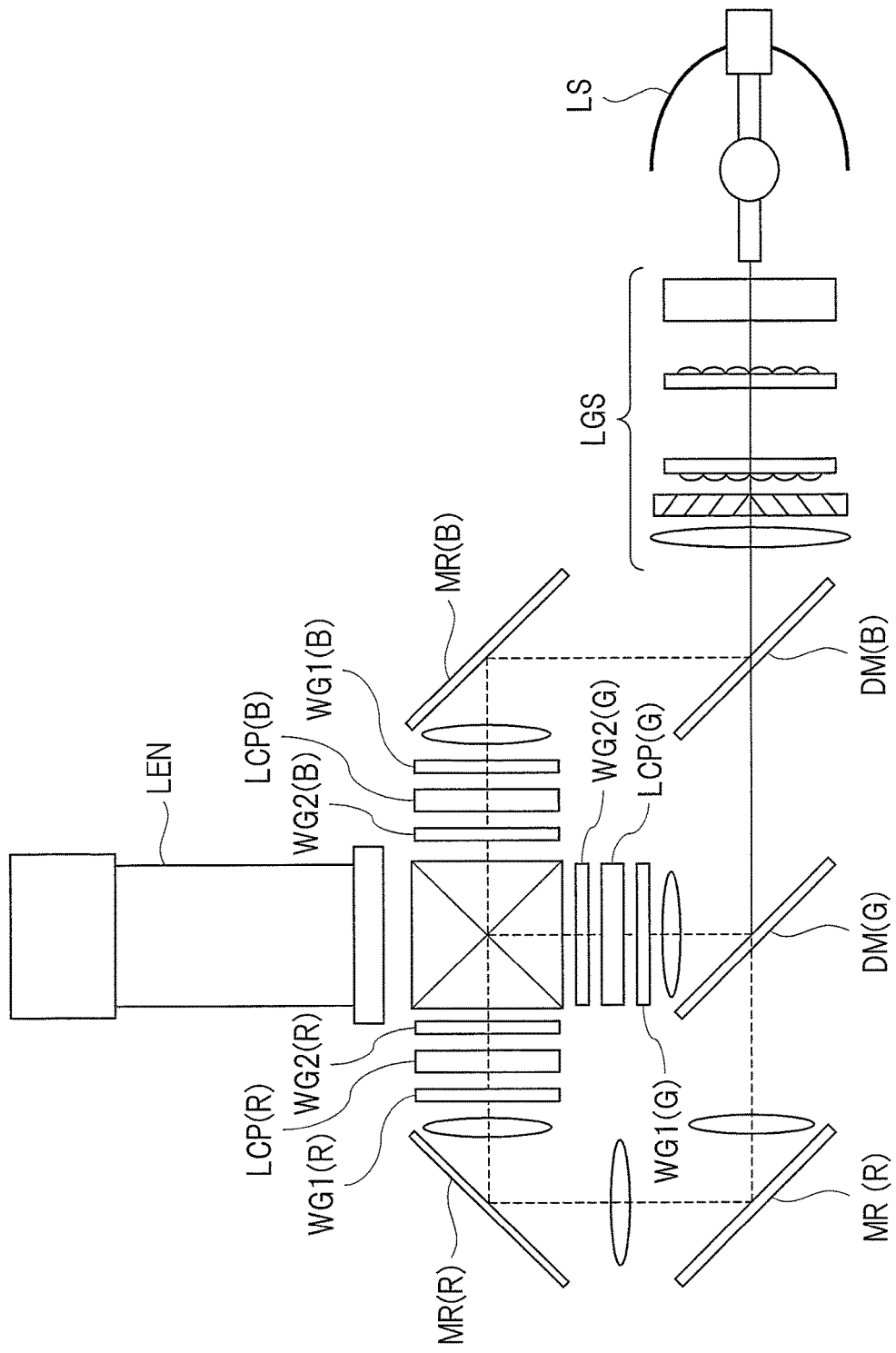
FIG. 42 is a schematic view illustrating an optical system of a liquid crystal projector according to the sixth embodiment.

FIG. 42 is a schematic view illustrating an optical system of a liquid crystal projector according to the present embodiment. As illustrated in FIG. 42, the liquid crystal projector according to the present embodiment includes a light source LS, a waveguide optical system LGS, dichroic mirrors DM(B) and DM(G), reflection mirrors MR(R) and MR(B), liquid crystal panels LCP(B), LCP(G), and LCP(R), polarizing filters WG1(G), WG1(B), WG1(R), WG2(G), WG2 (B), and WG2(R), and a projector lens LEN.

The light source LS is composed of a halogen lamp or the like, and is configured to emit white light including blue light, green light, and red light. The waveguide optical system LGS is configured to uniformize and collimate a distribution of light emitted from the light source LS.

The dichroic mirror DM (B) is configured to reflect light having a wavelength corresponding to the blue light and transmit the other green light and red light. Similarly, the dichroic mirror DM(G) is configured to reflect light having a wavelength corresponding to the green light and transmit the other red light. Also, the reflection mirror MR(R) is configured to reflect the red light, and the reflection mirror MR(B) is configured to reflect the blue light.

Each of the liquid crystal panels LCP(B), LCP(G), and LCP(R) is configured to perform intensity modulation of polarized light in accordance with image information. Each of the liquid crystal panels LCP(B), LCP(G), and LCP(R) is electrically connected to a control circuit (not illustrated) that controls the liquid crystal panel, and a voltage to be applied to the liquid crystal panel is controlled based on a control signal from the control circuit.

017 Each of the polarizing filters WG1(G) and WG2(G) is a polarizing filter for green, and is configured to selectively transmit only specific polarized light included in the green light. Similarly, each of the polarizing filters WG1(B) and WG2(B) is a polarizing filter for blue, and is configured to selectively transmit only specific polarized light included in the blue light. Also, each of the polarizing filters WG1(R) and WG2(R) is a polarizing filter for red, and is configured to selectively transmit only specific polarized light included in the red light. Note that the projection lens LEN is a lens for projecting an image.

Next, an example of an operation of the liquid crystal projector according to the present embodiment will be described below. The white light including the blue light, the green light, and the red light is emitted from the light source LS composed of a halogen lamp or the like illustrated in FIG. 42. Then, the white light emitted from the light source LS is incident on the waveguide optical system LGS, and a light distribution of the white light is uniformized and collimated. Then, the white light emitted from the waveguide optical system LGS is first incident on the dichroic mirror DM(B). Only the blue light included in the white light is reflected by the dichroic mirror DM(B), and the green light and the red light are transmitted through the dichroic mirror DM(B).

The green light and the red light transmitted through the dichroic mirror DM(B) are incident on the dichroic mirror DM(G). Only the green light is reflected by the dichroic mirror DM(G), and the red light is transmitted through the dichroic mirror DM(G). In this manner, the white light is separated into the blue light, the green light, and the red light.

Subsequently, the separated blue light is reflected by the reflection mirror MR(B) and is then incident on the polarizing filter WG1(B), and specific polarized light included in the blue light is selectively transmitted. Then, selectively transmitted polarized light is incident on the liquid crystal panel LCP(B). In the liquid crystal panel LCP(B), the intensity of the incident polarized light is modulated based on the control signal. Then, the polarized light whose intensity has been modulated is emitted from the liquid crystal panel LCP(B) and is incident on the polarizing filter WG2(B), and is then emitted from the polarizing filter WG2(B).

Similarly, the separated green light is incident on the polarizing filter WG1(G), and specific polarized light included in the green light is selectively transmitted. Then, the selectively transmitted polarized light is incident on the liquid crystal panel LCP(G). In the liquid crystal panel LCP(G), the intensity of the incident polarized light is modulated based on the control signal. Then, the polarized light whose intensity has been modulated is emitted from the liquid crystal panel LCP(G) and is incident on the polarizing filter WG2(G), and is then emitted from the polarizing filter WG2(G).

Similarly, the separated red light is reflected by the reflection mirror MR(R) and is then incident on the polarizing filter WG1(R), and specific polarized light included in the red light is selectively transmitted. Then, the selectively transmitted polarized light is incident on the liquid crystal panel LCP(R). In the liquid crystal panel LCP(R), the intensity of the incident polarized light is modulated based on the control signal. Then, the polarized light whose intensity has been modulated is emitted from the liquid crystal panel LCP(R) and is incident on the polarizing filter WG2(R), and is then emitted from the polarizing filter WG2(R).

Thereafter, the polarized light (blue) emitted from the polarizing filter WG2(B), the polarized light (green) emitted from the polarizing filter WG2(G), and the polarized light (red) emitted from the polarizing filter WG2(R) are multiplexed, and are projected onto a screen (not illustrated) via the projection lens LEN. In this manner, an image can be projected.

The performance of the liquid crystal projector can be improved by using the optical elements (polarizing filters) described in the first to fifth embodiments as, for example, the polarizing filters WG1(G), WG1(B), WG1(R), WG2(G), WG2(B), and WG2(R) mentioned above. Concretely, the deterioration of the wires (P10) due to the entrance of water in the polarizing filter can be reduced, and a display image on the liquid crystal projector can be improved. For example, the reduction of the light extinction function described with reference to FIG. 26(C) can be suppressed.

In the foregoing, the invention made by the inventors of the present invention has been concretely described based on the embodiments. However, it is needless to say that the present invention is not limited to the foregoing embodiments and various modifications and alterations can be made within the scope of the present invention.

Figure 43:
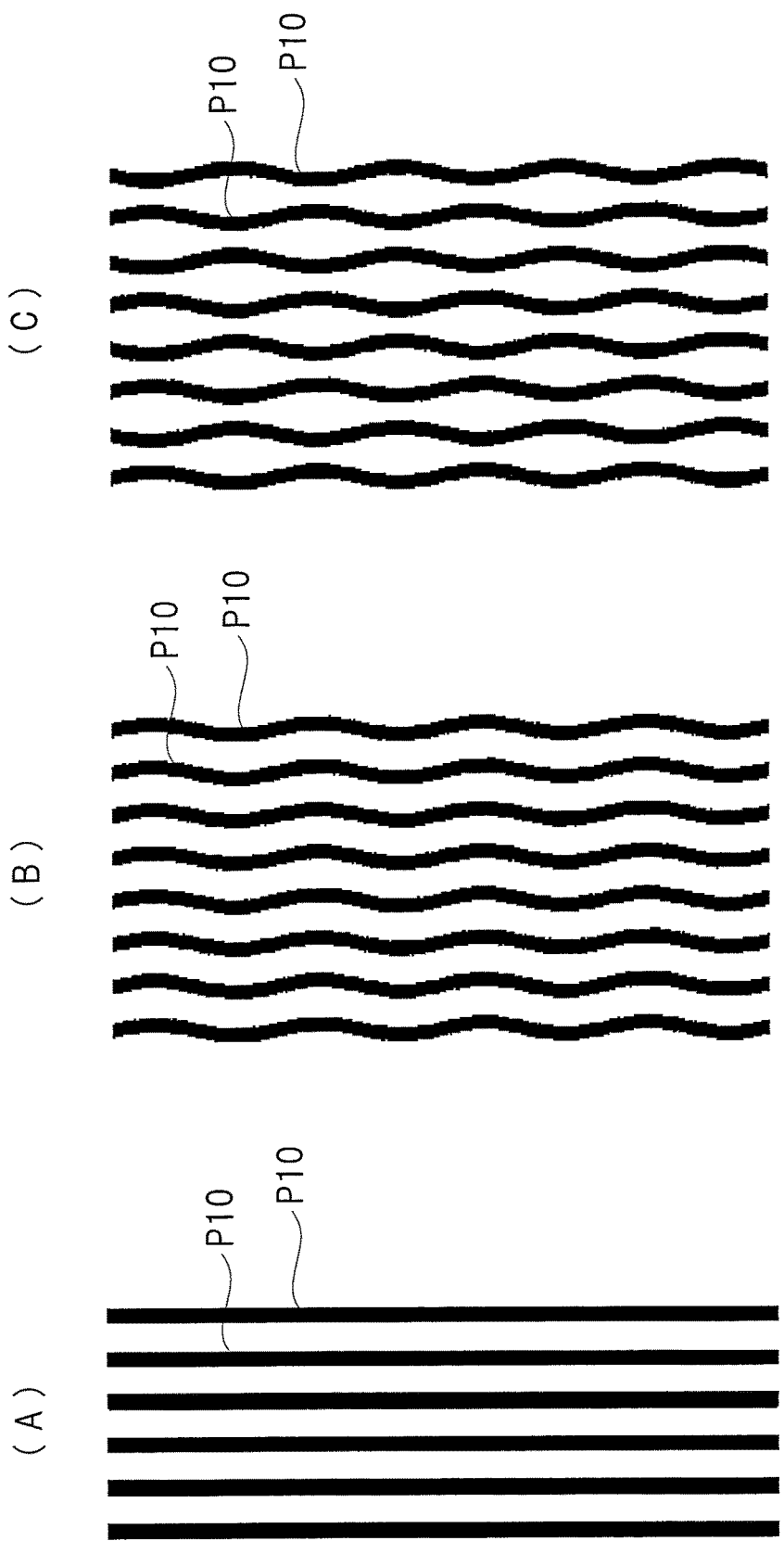
FIGS. 43(A) to 43(C) are plan views illustrating examples of a periodic structure of wires.

For example, in the description of the first embodiment and others, the so-called "wire-grid (metallic grating)" in which line-shaped wires P10 are repeatedly arranged at predetermined intervals (spaces) is taken as an example, but the shape of the wires P10 is not limited to this. FIGS. 43(A) to 43(C) are plan views illustrating examples of a periodic structure of wires. FIG. 43(A) is a plan view illustrating the above-mentioned wire-grid structure. FIGS. 43(B) and 43(C) are plan views illustrating a wobble wire structure. As illustrated in FIGS. 43(B) and 43(C), the wires P10 may be a wavy line shape (wobble shape) instead of the liner shape. Also, the intervals between the wires P10 may be substantially constant as illustrated in FIGS. 43(A) and 43(B) or vary as illustrated in FIG. 43(C).

Also, in the description of the sixth embodiment above, a display device such as a liquid crystal projector is taken as an example, but the optical elements (polarizing filters) described in the above-mentioned first to fifth embodiments can be applied also to an optical device such as an optical head and a transmitter-receiver for optical communication in addition thereto.

Also, although the descriptions of the embodiments above have been made on the premise of the optical element and the optical device adapted to visible light to near infrared light, the technical idea of the invention of the present application can be similarly applied not only to such general light but also to other electromagnetic waves as long as conforming to Maxwell equations. Concretely, in a wireless device having a frequency of 77 GHz, a wavelength of an electromagnetic wave (light) is approximately 4 mm, and the optical elements (reflection type polarizers) according to the above-mentioned embodiments can be applied as optical components also to a device adapted to such an electromagnetic wave. In this case, wires (wire-grid) are arranged at a smaller pitch than the above-mentioned wavelength, and protruding portions (P20 and others) are provided in a peripheral region like the above-mentioned embodiments. The concave and convex portion (wires, protruding portions and others) of the reflection type polarizer like this can be formed by using, for example, press stamping and grinding process.

EXPLANATION OF REFERENCE CHARACTERS

1A Wire-grid region
1S Substrate
2A Peripheral region
CH Chip region
D1 Width
D2 Width
D3 Width
DM Dichroic mirror
LCP Liquid crystal panel
LEN Projection lens
LGS Waveguide optical system
LS Light source
M Master
M10 Projection
M20 Projection
M21 Projection
ML Metal layer
MR Reflection mirror
P10 Wire
P20 Protruding portion
P21 Protruding portion
PD1 Width
PD2 Space
RR Resist resin
RR10 Projection
RR20 Projection
Rs UV curable resin
S Interval (space)
S10 Groove
S20 Groove
S21 Groove
ST Stamper
Ss Support substrate
W Wafer substrate
WG1 Polarizing filter
WG2 Polarizing filter
a Line
b Line
c Line

What is claimed is:

1. An optical element comprising:
a substrate having a first region and a second region positioned on an outer periphery of the first region,
wherein a first projection group in which a plurality of line-shaped first projections made of a first material and extending in a first direction are arranged at first intervals in a second direction crossing the first direction is provided in the first region of the substrate,
a second projection group in which a plurality of second projections made of the first material are arranged is provided in the second region,
an electromagnetic wave incident from a side of one surface of the substrate is polarized in the first projection group,
the second projection group has a checkerboard pattern when seen in a plan view, and
a third projection line entirely connected and surrounding the first projection group is provided between the first region and the second region.

2. The optical element according to claim 1, wherein the second projections are in a square shape when seen in a plan view.

3. The optical element according to claim 2, wherein, in the second projection group, one second projection and another second projection adjacent to the one second projection are brought into contact with or connected to each other.

4. The optical element according to claim 1, wherein a ratio of a formation region of the first projections in the first region is 25% or more and 40% or less.

5. The optical element according to claim 1, wherein, when a ratio of a formation region of the first projections in the first region is A (%), a ratio of a formation region of the second projections in the second region is A×0.8 (%) or more and A×1.2 (%) or less.

6. An optical device comprising:
(a) a light source;
(b) an optical element which selectively transmits specific polarized light from light emitted from the light source; and
(c) a liquid crystal panel on which the polarized light emitted from the optical element is incident and which modulates an intensity of the polarized light in accordance with image information,
wherein the optical element includes a substrate having a first region and a second region positioned on an outer periphery of the first region,
a first projection group in which a plurality of line-shaped first projections made of a first material and extending in a first direction are arranged at first intervals in a second direction crossing the first direction is provided in the first region of the substrate,
a second projection group in which a plurality of second projections made of the first material are arranged is provided in the second region,
an electromagnetic wave incident from a side of one surface of the substrate is polarized in the first projection group,
the second projection group has a checkerboard pattern when seen in a plan view, and
a third projection line entirely connected and surrounding the first projection group is provided between the first region and the second region.

7. An optical element comprising:
a substrate having a first region and a second region positioned on an outer periphery of the first region,
wherein a first projection group in which a plurality of line-shaped first projections made of a first material and extending in a first direction are arranged at first intervals in a second direction crossing the first direction is provided in the first region of the substrate, a second projection group in which a plurality of second projections made of the first material are arranged is provided in the second region, an electromagnetic wave incident from a side of one surface of the substrate is polarized in the first projection group, the second projection group has a checkerboard pattern when seen in a plan view, and wherein each of the plurality of second projections are in at least one of an H-shape, a U-shape, and a frame-shape when seen in the plan view, and a third projection surrounding the first projection group is provided between the first region and the second region.

8. The optical element according to claim 7, wherein, in the second projection group, one second projection and another second projection adjacent to the one second projection are brought into contact with or connected to each other.

9. The optical element according to claim 7, wherein a ratio of a formation region of the first projections in the first region is 25% or more and 40% or less.

10. The optical element according to claim 7, wherein, when a ratio of a formation region of the first projections in the first region is A (%), a ratio of a formation region of the second projections in the second region is A×0.8 (%) or more and A×1.2 (%) or less.

\* \* \* \* \*